United States Patent
Cousins

(10) Patent No.: US 9,700,787 B2
(45) Date of Patent: *Jul. 11, 2017

(54) SYSTEM AND METHOD FOR FACILITATING INTERACTION WITH A VIRTUAL SPACE VIA A TOUCH SENSITIVE SURFACE

(71) Applicant: DeNA Co., Ltd., Tokyo (JP)

(72) Inventor: Benjamin James Cousins, Stockholm (SE)

(73) Assignee: DeNA Co., Ltd., Tokyo (JP)

( * ) Notice: Subject to any disclaimer, the term of this patent is extended or adjusted under 35 U.S.C. 154(b) by 182 days.

This patent is subject to a terminal disclaimer.

(21) Appl. No.: 14/281,719

(22) Filed: May 19, 2014

(65) Prior Publication Data

US 2014/0256442 A1    Sep. 11, 2014

Related U.S. Application Data

(63) Continuation of application No. 13/600,806, filed on Aug. 31, 2012, now Pat. No. 8,777,743.

(51) Int. Cl.
*A63F 13/00* (2014.01)
*A63F 13/20* (2014.01)
(Continued)

(52) U.S. Cl.
CPC ............ *A63F 13/06* (2013.01); *A63F 13/214* (2014.09); *A63F 13/219* (2014.09);
(Continued)

(58) Field of Classification Search
CPC ...... G06F 3/017; G06F 3/04883; A63F 13/42; A63F 13/214; A63F 13/2145
See application file for complete search history.

(56) References Cited

U.S. PATENT DOCUMENTS 4,353,552 A * 10/1982 Pepper, Jr. .............. A63F 13/06
273/148 B
5,053,757 A * 10/1991 Meadows ............... G06F 3/044
341/22

(Continued)

FOREIGN PATENT DOCUMENTS

| EP | 2329868 | 8/2011 |
|---|---|---|
| JP | 2005-342266 | 12/2005 |
| JP | 2010-17395 | 1/2010 |

OTHER PUBLICATIONS

"Tunnel Shoot Review" by Bonnie Eisenman, published Jul. 18, 2010. Source: http://www.148apps.com/reviews/tunnel-shoot-review/.*

(Continued)

*Primary Examiner* — Steven J Hylinski
(74) *Attorney, Agent, or Firm* — Pillsbury Winthrop Shaw Pittman LLP

(57) ABSTRACT

This disclosure relates to a system and method for facilitating interaction with a virtual space via a touch sensitive surface. The user may interact with the virtual space via a touch sensitive surface in a wireless client device. The user may interact with the virtual space by providing control inputs to the touch sensitive surface. The control inputs may be reflected in one or more views of the virtual space. In some implementations, the system may be configured such that the one or more views of the virtual space include one or more views of a shooter game. The system may be configured such that the user may interact with the game primarily with fingers from one hand via the touch sensitive surface. The user may enter various command inputs into the touch sensitive surface that correspond to actions in the virtual space presented to the user.

14 Claims, 17 Drawing Sheets

(51) Int. Cl.
*A63F 13/42* (2014.01)
*A63F 13/214* (2014.01)
*A63F 13/219* (2014.01)
*A63F 13/837* (2014.01)
*A63F 13/426* (2014.01)
*A63F 13/5255* (2014.01)
*A63F 13/2145* (2014.01)

(52) U.S. Cl.
CPC .......... *A63F 13/2145* (2014.09); *A63F 13/42* (2014.09); *A63F 13/426* (2014.09); *A63F 13/5255* (2014.09); *A63F 13/837* (2014.09); *A63F 2300/1068* (2013.01); *A63F 2300/1075* (2013.01); *A63F 2300/204* (2013.01); *A63F 2300/6045* (2013.01); *A63F 2300/6676* (2013.01)

(56) References Cited

U.S. PATENT DOCUMENTS

| | | | | |
|---|---|---|---|---|
| 8,312,387 | B2* | 11/2012 | Williams | G06F 3/04883 715/800 |
| 8,441,452 | B1* | 5/2013 | Fuller | G06F 3/0416 345/173 |
| 8,564,546 | B1* | 10/2013 | Birch | G06F 3/0416 178/18.01 |
| 9,134,841 | B2* | 9/2015 | Hsieh | G06F 3/0414 |
| 2001/0029203 | A1 | 10/2001 | Shoji et al. | |
| 2007/0257891 | A1* | 11/2007 | Esenther | G06F 3/044 345/173 |
| 2007/0279394 | A1 | 12/2007 | Lampell et al. | 345/173 |
| 2008/0048910 | A1 | 2/2008 | Wang et al. | |
| 2008/0070684 | A1 | 3/2008 | Haigh-Hutchinson | 463/32 |
| 2008/0088598 | A1* | 4/2008 | Kogo | A63F 13/10 345/173 |
| 2010/0045666 | A1 | 2/2010 | Kornmann et al. | |
| 2010/0066681 | A1* | 3/2010 | Malabuyo | G06F 3/016 345/169 |
| 2011/0285636 | A1* | 11/2011 | Howard | G06F 3/04815 345/173 |
| 2012/0052952 | A1* | 3/2012 | Nishida | A63F 13/10 463/37 |

OTHER PUBLICATIONS

Japanese Office Action in connection with Japanese Patent Application No. 2013-175462 mailed on Nov. 26, 2013, with English translation, 7 pages.
Japanese Office Action in connection with Japanese Patent Application No. 2013-175462 issued on Apr. 15, 2014 and English translation.
Metal Gear Solid Touch, *Weekly Famitsu,* Enterbrain, Inc., Apr. 3, 2009, vol. 24, No. 15, pp. 76-77.
Braveheart, Strategy for Overseas Game Application on iPhone and iPad, Cosmic Publishers, Inc., Mar. 19, 2011, pp. 94-95.
The extended European Search Report mailed on Feb. 3, 2015 in connection with European Patent Application No. 13175686.8; 7 pages.
Wroblewski, Luke; "Touch Gesture Reference Guide"; Apr. 19, 2010; 11 pages.
Buchanan; Levi; "Zombie Crisis 3D iPhone Review—IGN"; Nov. 11, 2010; 6 pages.
Dev, Drakkar; "Monster of Puppets iPhone, iPad, Android game"; Apr. 29, 2012; 4 pages.
Office Action as issued in Chinese Patent Application No. 201310384496.2, dated Apr. 28, 2017.
Buchanan, L., "Zombie Crisis 3D iPhone Review," <IGN, URL:http://www.ign.com/articles/2010/11/11/zombie-crisis-3d-iphone-review>, Nov. 11, 2011.
Wroblewki , L., "Touch Gesture Reference Guide," <LukeW, URL: http://www.lukew.com/ff/entry.asp?1071>, Apr. 20, 2010.

* cited by examiner

SYSTEM AND METHOD FOR FACILITATING INTERACTION WITH A VIRTUAL SPACE VIA A TOUCH SENSITIVE SURFACE

FIELD

This disclosure relates to a system and method for facilitating interaction with a virtual space via a touch sensitive surface.

BACKGROUND

First person shooter games played on hand held devices with touch panel displays exist. Typically, first person shooter games played on hand held devices with touch panel displays use a "virtual stick" method to control a user character and/or other elements of the game. The virtual stick method of control simulates electronic gaming console style controls on the touch panel display. The virtual stick method of control requires the user to play the first person shooter game with two hands.

SUMMARY

One aspect of the disclosure relates to a system configured to facilitate interaction of a user with a virtual space. The user may interact with the virtual space via a touch sensitive surface in a wireless client device. The user may interact with the virtual space by providing control inputs to the touch sensitive surface. The control inputs may be reflected in one or more views of the virtual space. In some implementations, the system may be configured such that the one or more views of the virtual space include one or more views of a shooter game. The system may be configured such that the user may interact with the game primarily with fingers from one hand via the touch sensitive surface. The user may enter various command inputs into the touch sensitive surface that correspond to actions in the virtual space presented to the user. In some implementations, the system may comprise the wireless client device, a game server, and/or other components.

The wireless client device may be a mobile device configured to provide an interface for the user to interact with the virtual space, the game and/or other applications. The wireless client device may be configured to communicate with the game server, other wireless clients, and/or other devices in a client/server configuration. The wireless client device may include a user interface, one or more processors, electronic storage, and/or other components.

The user interface may be configured to provide an interface between the wireless client and the user through which the user may provide information to and receive information from the system. The user interface may comprise a touch sensitive surface, a display, and/or other components.

The processor may be configured to execute one or more computer program modules. The one or more computer program modules may comprise one or more of a game module, a gesture recognition module, a control module, and/or other modules.

The game module may be configured to execute an instance of the virtual space. The game module may be configured to facilitate interaction of the user with the virtual space by assembling one or more views of the virtual space for presentation to the user on the wireless client. The user may interact with the virtual space by providing control inputs to the touch sensitive surface that are reflected in the view(s) of the virtual space.

To assemble the view(s) of the virtual space, the game module may execute an instance of the virtual space, and may use the instance of the virtual space to determine view information that defines the view. To assemble the view(s) of the virtual space, the game module may obtain view information from the game server, which may execute an instance of the virtual space to determine the view information. The view information may include one or more of virtual space state information, map information, object or entity location information, manifestation information (defining how objects or entities are manifested in the virtual space), and/or other information related to the view(s) and/or the virtual space.

In some implementations, the game module may be configured such that the user may participate in a game in the virtual space. The game may include a shooter game mechanic. A shooter game mechanic may involve aiming and/or releasing a projectile toward a target in a field of view presented to the user. The projectile may be released from a virtual weapon in the virtual space (e.g., carried or operated by a user controlled character or other entity). A shooter game mechanic may include controlling a position of a character (e.g., a user character or other entity) within the virtual space, in addition to the aiming and/or releasing of the projectile. In some implementations, the shooter game mechanic may involve sighting the target through a simulated sighting tool on the weapon, changing weapons, reloading the weapon, and/or other aspects of the shooter game mechanic The gesture recognition module may be configured to identify individual ones of a set of gestures made by the user on the touch sensitive surface. The gesture recognition module may be configured to identify the individual ones of the set of gestures based on output signals from the touch sensitive surface. A gesture may be defined by one or more gesture parameters. The one or more gesture parameters may include one or more directions of motion during a contact, a shape of a motion made during a contact, one or more contact locations, a specific sequence of one or more motions, a specific arrangement of one or more contact locations, relative positioning between multiple contacts, a relative timing of multiple contacts, a hold time of one or more contacts, and/or other parameters. A gesture definition of an individual gesture may specify parameter values for one or more gesture parameters. The gesture recognition module may have access to a plurality of stored gesture definitions.

Identification of a user gesture may be made based on analysis of the information conveyed by the output signals from the touch sensitive surface. The analysis may include a comparison between the gesture definitions and the information conveyed by the output signals. The gesture recognition module may be configured to determine the parameter values for gesture parameters of a current or previously performed interaction of the user with the touch sensitive surface. The determined parameter values may then be compared with the parameter values specified by the gesture definitions to determine whether the current or previously performed interaction matches one of the gesture definitions. Responsive to a match between a gesture definition and the interaction performed by the user, the gesture recognition module may be configured to identify the user's interaction as the gesture corresponding to the matched gesture definition.

The control module may be configured to determine control inputs from the user. The control module may be configured to determine the control inputs based on the identified gestures. The control module may be configured such that responsive to the gesture recognition module identifying individual ones of the set of gestures, the control module may determine control inputs corresponding to the identified gestures. The game module may be configured such that reception of the control inputs may cause actions in the virtual space.

The touch sensitive surface may be configured to generate output signals responsive to contact by a user. The output signals may be configured to convey information related to one or more locations where the touch sensitive surface is contacted. In some implementations, the touch sensitive surface may include the display. The display may be configured to present visual information to the user. The visual information may include one or more views of the virtual space and/or one or more other views. In some embodiments, the one or more contact locations on the touch sensitive surface may correspond to one or more locations on the display.

In some implementations, the touch sensitive surface may comprise a touchscreen. The touchscreen may be configured to provide the interface to the wireless client through which the user may input information to and/or receives information from the wireless client. Through an electronic display capability of the touchscreen, views of the virtual space, views of the first person shooter game, graphics, text, and/or other visual content may be presented to the user. Superimposed over some and/or all of the electronic display of the touchscreen, the touchscreen may include one or more sensors configured to generate output signals that indicate a position of one or more objects that are in contact with and/or proximate to the surface of the touchscreen.

A first user interaction made by a user on the touch sensitive surface may be a two fingered tap gesture. The first user interaction may effect release of a corresponding projectile from a weapon, for example, in a first view of the virtual space. The user may use the first interaction to release and/or aim the release of the projectile in the virtual space. The first user interaction may comprise tapping the touch sensitive surface at two locations substantially simultaneously. The gesture recognition module may be configured to identify the first user interaction as the two fingered tap gesture made by the user on the touch sensitive surface. The control module may be configured such that responsive to the gesture recognition module identifying the two fingered tap gesture, the control module may determine a first control input from the user that causes the game module to cause the release of the projectile in the virtual space. The first control input may specify a target location in the virtual space toward which the projectile is directed. In some implementations, the target location may correspond to a control location on the touch sensitive surface that corresponds to one or both of the locations at which the user contacted the touch sensitive surface in making the two fingered tap gesture. In some implementations, the control location may be the location on the touchscreen at which the target location is displayed. In some implementations, the control location may be the center point between the two locations at which the user contacted the touch sensitive surface in making the two fingered tap gesture.

A second user interaction on the touch sensitive surface may be a reverse pinch gesture. The system may be configured to present one or more views simulating sighting through a sighting tool of a firearm responsive to an entry of the second user interaction on the touch sensitive surface. The second user interaction may comprise contacting the touch sensitive surface at two locations substantially simultaneously, then moving the two contact locations farther apart while remaining in contact with the touch sensitive surface. The gesture recognition module may be configured to identify the second user interaction as the reverse pinch gesture made by the user on the touch sensitive surface. The control module may be configured such that responsive to the gesture recognition module identifying the reverse pinch gesture, the control module may determine a second control input from the user. The second control input may cause the game module to simulate sighting through a sighting tool in a second view of the virtual space. In some implementations, the game module may be configured such that at least some of the virtual space and/or or game functionality normally available to a user during game play is reduced responsive to the second control input causing the game module to cause the second view to simulate sighting through a sighting tool. In some implementations, the system may be configured such that the sighting view is discontinued responsive to a third user interaction on the touch sensitive surface. The third user interaction may be a pinch gesture.

A fourth user interaction made by the user on the touch sensitive surface may be a move gesture. The fourth interaction may comprise contacting the touch sensitive surface at a location that corresponds to a move location in the virtual space. The gesture recognition module may be configured to identify the fourth user interaction as the move gesture made by the user on the touch sensitive surface. The control module may be configured such that responsive to the gesture recognition module identifying the move gesture, the control module may determine a fourth control input that causes the game module to change the view presented to the user from a third view representative of a current location in the virtual space to a fourth view representative of the move location. In some implementations, the move location may be the location on the touchscreen at which the user contacts the touchscreen with the move gesture.

DETAILED DESCRIPTION

Figure 1:
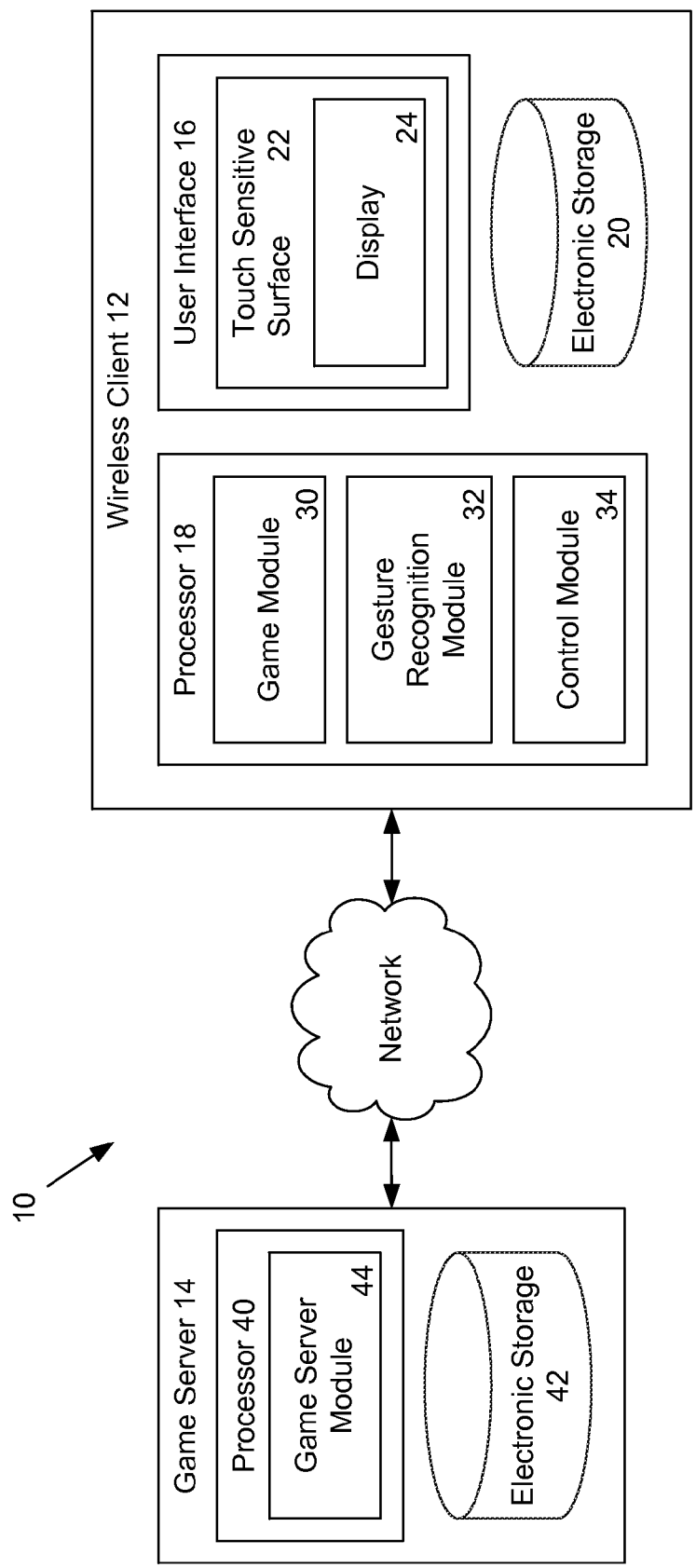
FIG. 1 is a schematic illustration of a system configured to facilitate interaction of a user with a virtual space.

FIG. 1 is a schematic illustration of a system 10 configured to facilitate interaction of a user with a virtual space. The user may interact with the virtual space via a touch sensitive surface in a wireless client device 12. The user may interact with the virtual space by providing control inputs to the touch sensitive surface. The control inputs may be reflected in one or more views of the virtual space. In some implementations, system 10 may be configured such that the one or more views of the virtual space include one or more views of a shooter game (e.g., a first person shooter, a third person shooter, and/or other shooter mechanics). The game may not be entirely a shooter-style game, but may be a game that has other components and/or mechanics besides a shooter mechanic. System 10 may be configured such that the user may interact with the game primarily with fingers from one hand via the touch sensitive surface. The user may enter various command inputs into the touch sensitive surface that correspond to actions in the virtual space presented to the user.

The description herein of the use of system 10 in conjunction with a shooter game is not intended to limit the scope of the disclosure. Rather, it will be appreciated that the principles and system described herein may be applied to virtual space and/or other electronic applications wherein one handed control is advantageous. In some implementations, system 10 may comprise the wireless client device 12, a game server 14, and/or other components.

Wireless client device 12 may be a mobile device configured to provide an interface for the user to interact with the virtual space, the game and/or other applications. Wireless client device 12 may include, for example, a smartphone, a tablet computing platform, and/or other mobile devices. Wireless client device 12 may be configured to communicate with game server 14, other wireless clients, and/or other devices in a client/server configuration. Such communications may be accomplished at least in part via one or more wireless communication media. Such communication may be transmitted through a network such as the Internet and/or other networks. Wireless client device 12 may include a user interface 16, one or more processors 18, electronic storage 20, and/or other components.

User interface 16 may be configured to provide an interface between wireless client 12 and the user through which the user may provide information to and receive information from system 10. User interface 16 may comprise a touch sensitive surface 22, a display 24, and/or other components.

Processor 18 may be configured to execute one or more computer program modules. The one or more computer program modules may comprise one or more of a game module 30, a gesture recognition module 32, a control module 34, and/or other modules.

Game module 30 may be configured to execute an instance of the virtual space. Game module 30 may be configured to facilitate interaction of the user with the virtual space by assembling one or more views of the virtual space for presentation to the user on wireless client 12. The user may interact with the virtual space by providing control inputs to touch sensitive surface 22 that are reflected in the view(s) of the virtual space.

To assemble the view(s) of the virtual space, game module 30 may execute an instance of the virtual space, and may use the instance of the virtual space to determine view information that defines the view. To assemble the view(s) of the virtual space, game module 30 may obtain view information from game server 14, which may execute an instance of the virtual space to determine the view information. The view information may include one or more of virtual space state information, map information, object or entity location information, manifestation information (defining how objects or entities are manifested in the virtual space), and/or other information related to the view(s) and/or the virtual space.

The virtual space may comprise a simulated space that is accessible by users via clients (e.g., wireless client device 12) that present the views of the virtual space to a user. The simulated space may have a topography, express ongoing real-time interaction by one or more users, and/or include one or more objects positioned within the topography that are capable of locomotion within the topography. In some instances, the topography may be a 2-dimensional topography. In other instances, the topography may be a 3-dimensional topography. The topography may include dimensions of the space, and/or surface features of a surface or objects that are "native" to the space. In some instances, the topography may describe a surface (e.g., a ground surface) that runs through at least a substantial portion of the space. In some instances, the topography may describe a volume with one or more bodies positioned therein (e.g., a simulation of gravity-deprived space with one or more celestial bodies positioned therein).

Within the instance(s) of the virtual space executed by game module 30, the user may control one or more entities to interact with the virtual space and/or each other. The entities may include one or more of characters, objects, simulated physical phenomena (e.g., wind, rain, earthquakes, and/or other phenomena), and/or other elements within the virtual space. The user characters may include avatars. As used herein, an entity may refer to an object (or group of objects) present in the virtual space that represents an individual user. The entity may be controlled by the user with which it is associated. The user controlled element(s) may move through and interact with the virtual space (e.g., non-user characters in the virtual space, other objects in the virtual space). The user controlled elements controlled by and/or associated with a given user may be created and/or customized by the given user. The user may have an "inventory" of virtual goods and/or currency that the user can use (e.g., by manipulation of a user character or other user controlled element, and/or other items) within the virtual space.

In some implementations, the users may interact with each other through communications exchanged within the virtual space. Such communications may include one or more of textual chat, instant messages, private messages, voice communications, and/or other communications. Communications may be received and entered by the users via their respective client devices (e.g., wireless client device 12). Communications may be routed to and from the appropriate users through game server 14.

In some implementations, game module 30 may be configured such that the user may participate in a game in the virtual space. The game may include a shooter game mechanic. A shooter game mechanic may involve aiming and/or releasing a projectile toward a target in a field of view presented to the user. The projectile may be released from a virtual weapon in the virtual space (e.g., carried or operated by a user controlled character or other entity). A shooter game mechanic may include controlling a position of a character (e.g., a user character or other entity) within the virtual space, in addition to the aiming and/or releasing of the projectile. In some implementations, the shooter game mechanic may involve sighting the target through a simulated sighting tool on the weapon, changing weapons, reloading the weapon, and/or other aspects of the shooter game mechanic. In some implementations, the game may include various tasks, levels, quests, and/or other challenges or activities in which one or more users may participate. The game may include activities in which users (or their entities) are adversaries, and/or activities in which users (or their entities) are allies. The game may include activities in which users (or their entities) are adversaries of non-player characters, and/or activities in which users (or their entities) are allies of non-player characters. In the game, entities controlled by the user may obtain points, virtual currency or other virtual items, experience points, levels, and/or other demarcations indicating experience and/or success. The game may be implemented in the virtual space, or may be implemented without the virtual space. The game (and/or a virtual space in which it may be implemented) may be synchronous, asynchronous, and/or semi-synchronous.

Gesture recognition module 32 may be configured to identify individual ones of a set of gestures made by the user on touch sensitive surface 22. Gesture recognition module 32 may be configured to identify the individual ones of the set of gestures based on output signals from touch sensitive surface 22. A gesture may be defined by one or more gesture parameters. The one or more gesture parameters may include one or more directions of motion during a contact, a shape of a motion made during a contact, one or more contact locations, a specific sequence of one or more motions, a specific arrangement of one or more contact locations, relative positioning between multiple contacts, a relative timing of multiple contacts, a hold time of one or more contacts, and/or other parameters. A gesture definition of an individual gesture may specify parameter values for one or more gesture parameters. Gesture recognition module 32 may have access to a plurality of stored gesture definitions (e.g., stored locally on wireless client device 12).

Identification of a user gesture may be made based on analysis of the information conveyed by the output signals from touch sensitive surface 22. The analysis may include a comparison between the gesture definitions and the information conveyed by the output signals. Gesture recognition module 32 may be configured to determine the parameter values for gesture parameters of a current or previously performed interaction of the user with touch sensitive surface 22. The determined parameter values may then be compared with the parameter values specified by the gesture definitions to determine whether the current or previously performed interaction matches one of the gesture definitions. Responsive to a match between a gesture definition and the interaction performed by the user, gesture recognition module 32 may be configured to identify the user's interaction as the gesture corresponding to the matched gesture definition.

The individual ones of the set of gestures may include a two fingered tap gesture, a reverse pinch gesture, a move gesture, a look gesture, a turn gesture, a weapon change gesture, a reload gesture, and/or other gestures.

Control module 34 may be configured to determine control inputs from the user. Control module 34 may be configured to determine the control inputs based on the identified gestures. Control module 34 may be configured such that responsive to the gesture recognition module identifying individual ones of the set of gestures, control module 34 may determine control inputs corresponding to the identified gestures. Game module 30 may be configured such that reception of the control inputs may cause actions in the virtual space, and/or in the first person shooter game, for example. In some implementations, the control inputs may be configured to cause one or more actions including aiming and/or releasing a projectile (e.g., responsive to the two fingered tap gesture), sighting one or more objects through a sighting tool (e.g., responsive to the reverse pinch gesture), moving a user character within the virtual space (e.g., responsive to the move gesture), looking in a specific direction (e.g., responsive to the look gesture), turning around (e.g., responsive to the turn gesture), changing a weapon (e.g., responsive to the weapon change gesture), reloading a weapon (e.g., responsive to the reload gesture), and/or other actions.

Touch sensitive surface 22 may be configured to generate output signals responsive to contact by a user. The output signals may be configured to convey information related to one or more locations where the touch sensitive surface is contacted. In some implementations, touch sensitive surface 22 may include display 24. Display 24 may be configured to present visual information to the user. The visual information may include one or more views of the virtual space and/or one or more other views. In some embodiments, the one or more contact locations on touch sensitive surface 22 may correspond to one or more locations on display 24.

In some implementations, touch sensitive surface 22 may comprise a touchscreen. The touchscreen may be configured to provide the interface to wireless client 12 through which the user may input information to and/or receives information from wireless client 12. Through an electronic display capability of the touchscreen, views of the virtual space, views of the first person shooter game, graphics, text, and/or other visual content may be presented to the user. Superimposed over some and/or all of the electronic display of the touchscreen, the touchscreen may include one or more sensors configured to generate output signals that indicate a position of one or more objects that are in contact with and/or proximate to the surface of the touchscreen. The sensor(s) of the touchscreen may include one or more of a resistive, a capacitive, surface acoustic wave, or other sensors. In some implementations the touchscreen may comprise one or more of a glass panel, a conductive layer, a resistive layer, a scratch resistant layer, a layer that stores electrical charge, a transducer, a reflector or other components.

Figure 2:
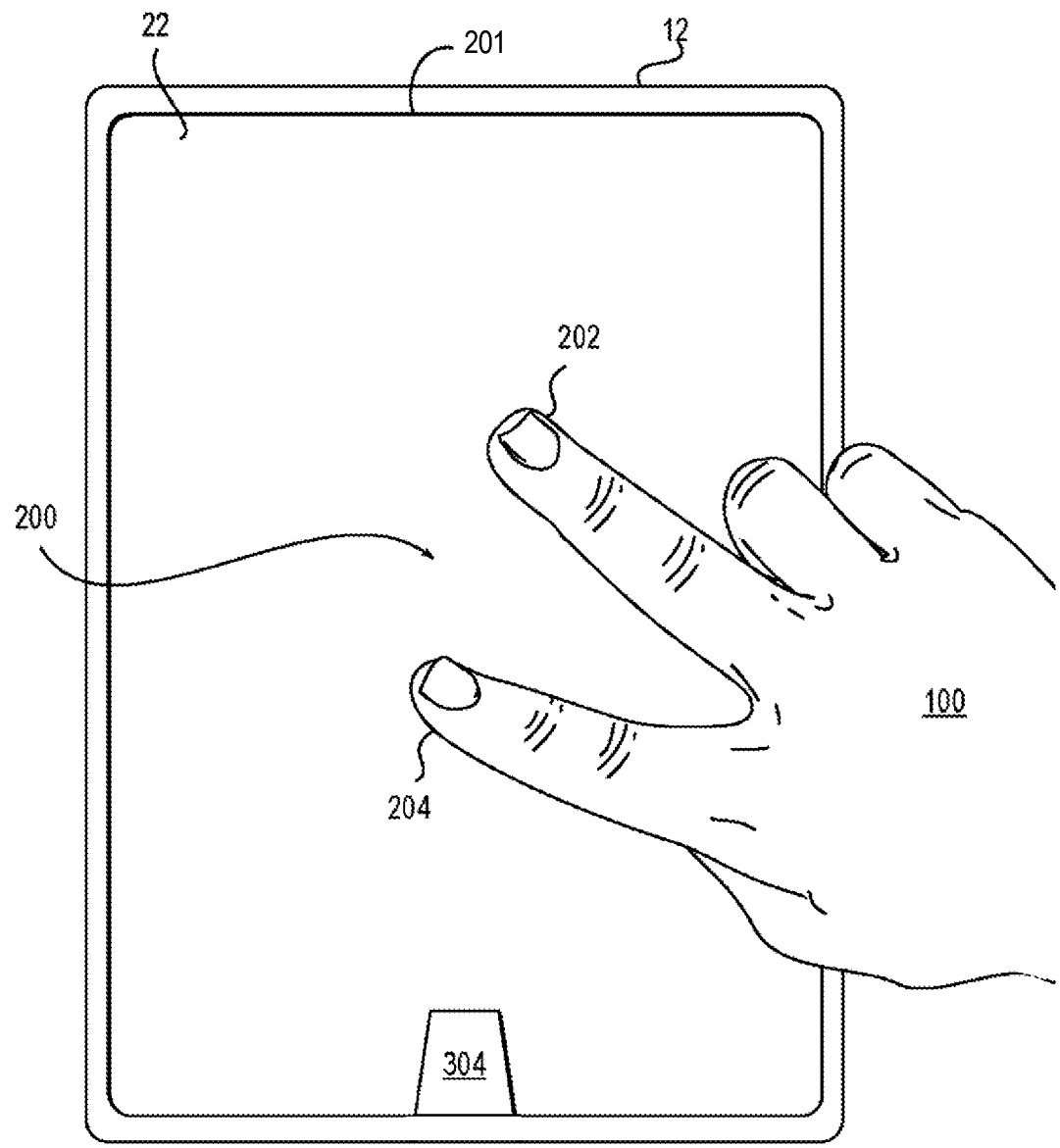
FIG. 2 illustrates a first user interaction made by a user on a touch sensitive surface.
Figure 3:
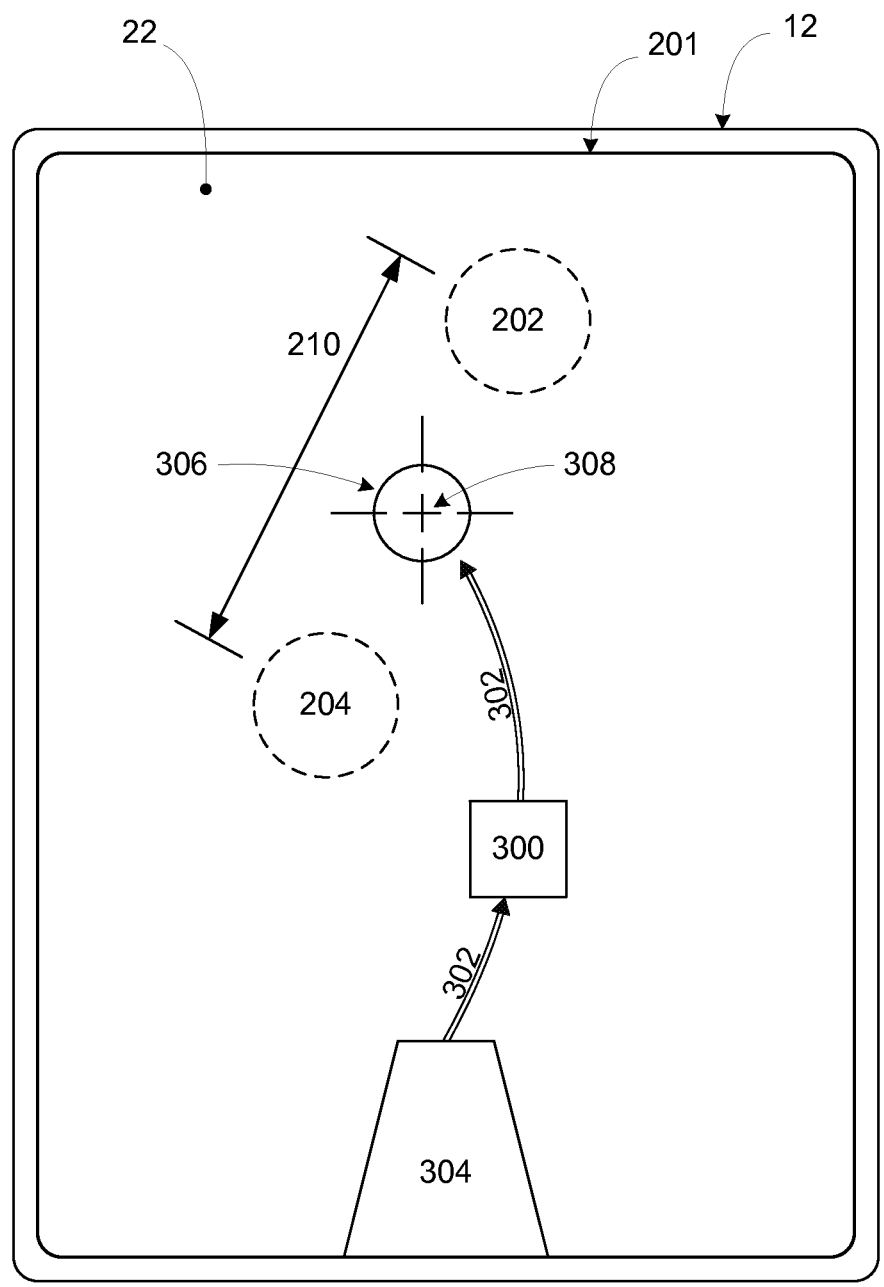
FIG. 3 illustrates a release of a projectile toward a target location displayed on the touch sensitive surface.

FIG. 2 and FIG. 3 illustrate a first user interaction 200 (FIG. 2) made by a user 100 on touch sensitive surface 22 (illustrated as a touchscreen in FIG. 2 and FIG. 3). First user interaction 200 may be a two fingered tap gesture. First user interaction 200 may effect release 302 (FIG. 3) of a corresponding projectile 300 from a weapon 304, for example, in a first view 201 of the virtual space. User 100 may use interaction 200 to release and/or aim the release of projectile 300 in the virtual space. As shown in FIG. 2, interaction 200 may comprise tapping touch sensitive surface 22 at two locations 202, 204 substantially simultaneously. The tapping interactions at locations 202 and 204 may be determined to be substantially simultaneous if both tapping interactions at locations 202 and 204 are made within a predetermined period of time. The predetermined period of time may begin when touch sensitive surface 22 receives the first one of contact at location 204, and/or contact at location 202, for example. The pre-determined period of time may be determined at manufacture, set by a user via a user interface of a wireless client (e.g., user interface 16 of wireless client 12), and/or determined by another method. A gesture recognition module (e.g., gesture recognition module 32 shown in FIG. 1 and described herein) may be configured to identify user interaction 200 as the two fingered tap gesture made by user 100 on touch sensitive surface 22. The gesture recognition module may be configured to determine the parameter values for the gesture parameters of interaction 200. The determined parameter values may then be compared with the parameter values specified by the definition of the two fingered tap gesture to determine whether interaction 200 matches the gesture definition of the two fingered tap gesture. Responsive to a match between the parameter values of the two fingered tap gesture definition and the parameter values of interaction 200 performed by the user, the gesture recognition module may be configured to identify interaction 200 as the two finger tap gesture. The gesture definition used to determine whether interaction 200 is a two finger tap gesture may include parameter values and/or parameter value thresholds defining one or more of a distance 210 between contact locations 202, 204, a minimum contact time and/or a maximum contact time, a maximum motion distance for contact locations 202 and/or 204, a maximum period of time between contact at location 202 and contact at location 204, and/or other gesture parameters.

A control module (e.g., control module 34 shown in FIG. 1 and described herein) may be configured such that responsive to the gesture recognition module identifying the two fingered tap gesture (FIG. 2), the control module may determine a first control input from user 100 that causes a game module (e.g., game module 30 shown in FIG. 1 and described herein) to cause the release 302 of projectile 300 in the virtual space (FIG. 3). The first control input may specify a target location 306 in the virtual space toward which the projectile is directed. In some implementations, target location 306 may correspond to a control location 308 on touch sensitive surface 22 that corresponds to one or both of the locations at which user 100 contacted the touch sensitive surface in making the two fingered tap gesture. In some implementations (e.g., when touch sensitive surface 22 comprises a touch screen), control location 308 may be the location on the touchscreen at which target location 306 is displayed. In some implementations, control location 308 may be the center point between the two locations 202, 204 at which user 100 contacted touch sensitive surface 22 in making the two fingered tap gesture.

Figure 4:
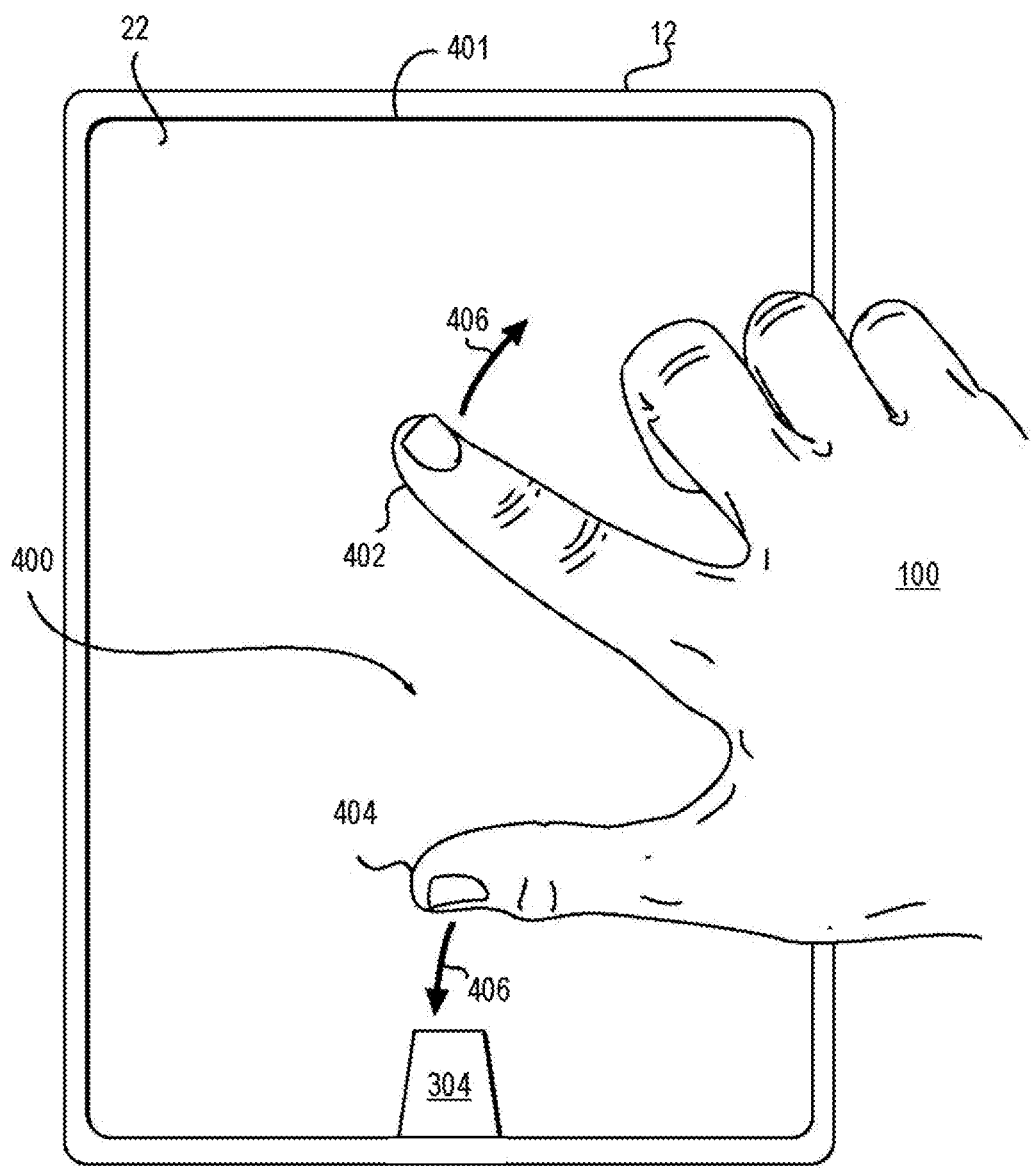
FIG. 4 illustrates a second user interaction made by the user on the touch sensitive surface.
Figure 5:
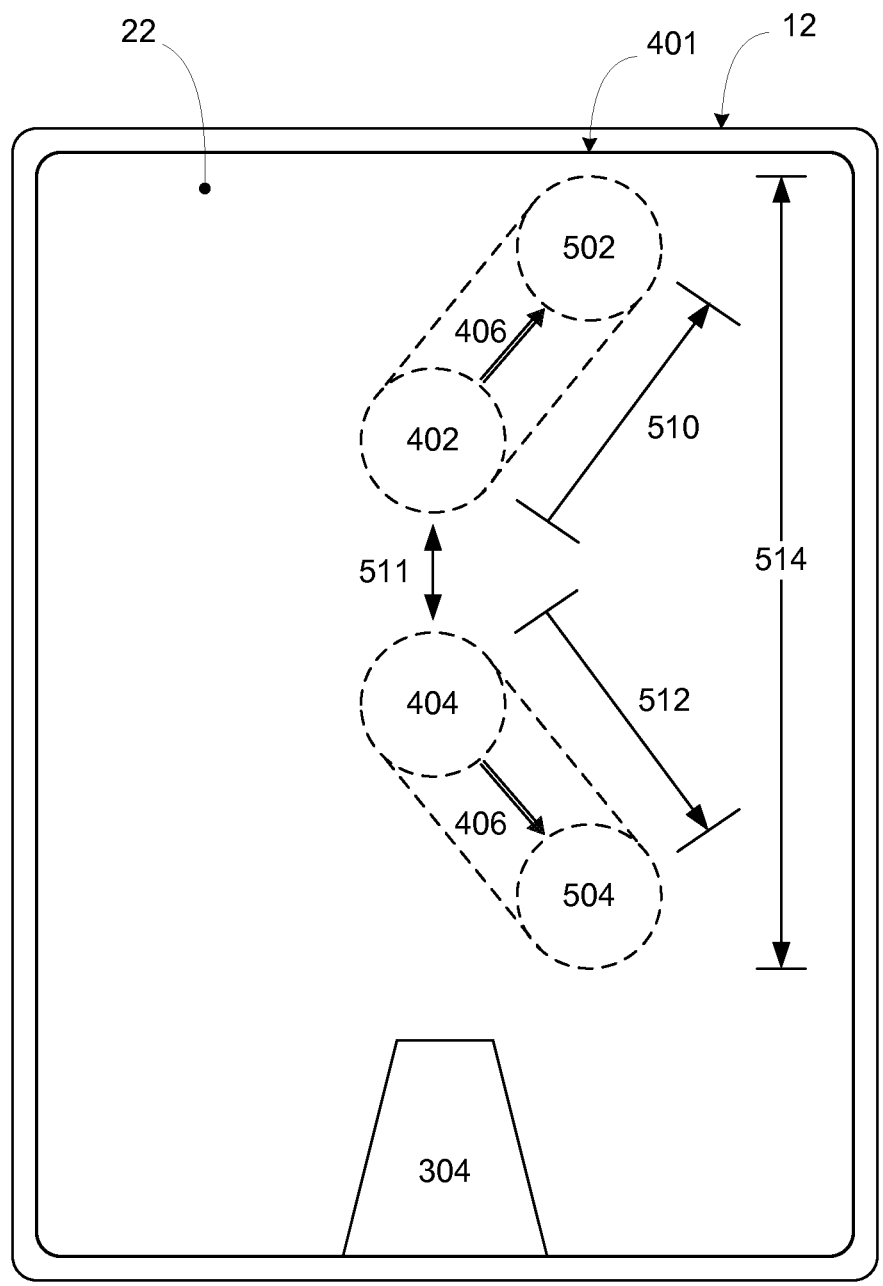
FIG. 5 illustrates movement of contact locations on the touch sensitive surface.

FIG. 4-FIG. 7 illustrate a second user interaction 400 (FIG. 4) on touch sensitive surface 22 (illustrated as a touchscreen in FIG. 4-FIG. 7). Second user interaction 400 may be a reverse pinch gesture. System 10 may be configured to present one or more views simulating sighting through a sighting tool (sighting view 700 shown in FIG. 7) of a firearm responsive to an entry of second user interaction 400 on touch sensitive surface 22. As shown in FIG. 4, second user interaction 400 may comprise contacting touch sensitive surface 22 at two locations 402, 404 substantially simultaneously, then moving 406 the two contact locations 402, 404 farther apart while remaining in contact with touch sensitive surface 22. FIG. 5 illustrates locations 402 and 404 farther apart at new locations 502 and 504. A gesture recognition module (e.g., gesture recognition module 32 shown in FIG. 1 and described herein) may be configured to identify user interaction 400 as the reverse pinch gesture made by user 100 on touch sensitive surface 22. The gesture recognition module may be configured to determine the parameter values for the gesture parameters of interaction 400. The determined parameter values may then be compared with the parameter values specified by the definition of the reverse pinch gesture to determine whether interaction 400 matches the gesture definition of the reverse pinch gesture. Responsive to a match between the parameter values of the reverse pinch gesture definition and the parameter values of interaction 400 performed by user 100, the gesture recognition module may be configured to identify interaction 400 as the reverse pinch gesture. The gesture definitions used to determine whether interaction 400 is a reverse pinch gesture may include parameter values and/or parameter value thresholds defining one or more of a minimum and/or a maximum distance 511 (FIG. 5) between contact locations 402, and 404, a maximum and/or a maximum distance 514 between contact locations 502 and 504, a minimum motion distance 510, 512 for contact locations 402 and/or 404, and/or other values.

Figure 6:
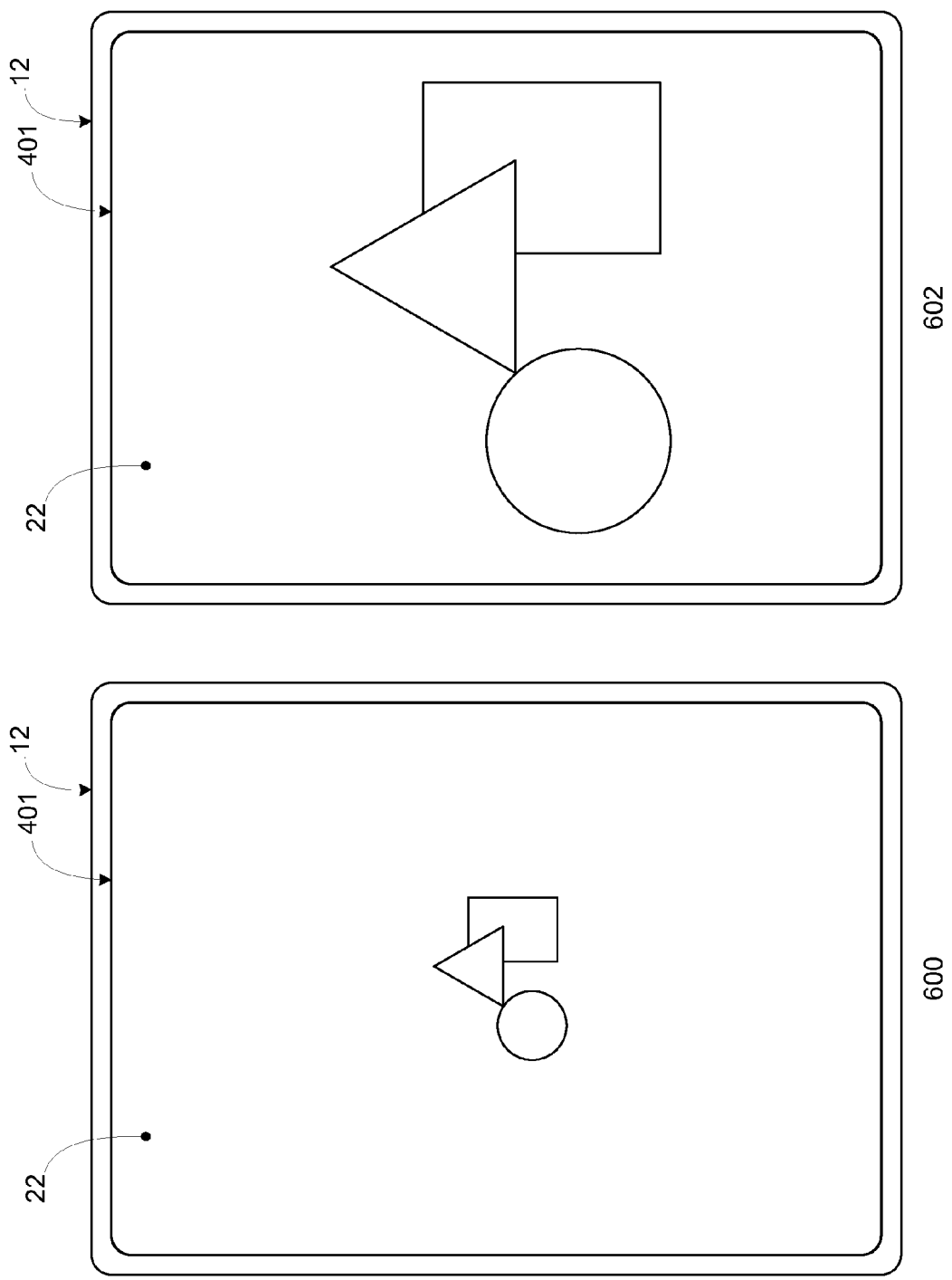
FIG. 6 illustrates a staged zoom of a view in the virtual space.
Figure 7:
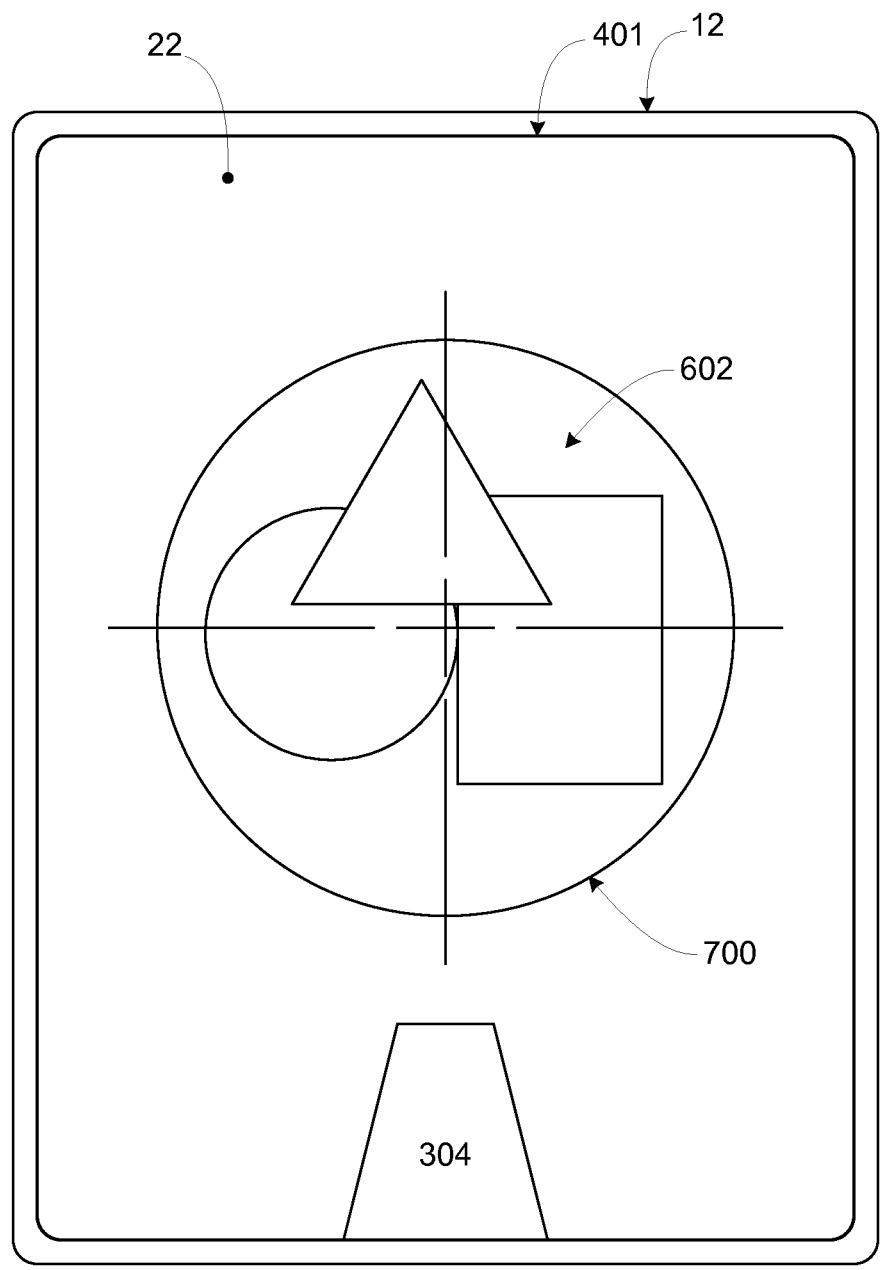
FIG. 7 illustrates sighting through a sighting tool.

A control module (e.g., control module 34 shown in FIG. 1 and described herein) may be configured such that responsive to the gesture recognition module identifying the reverse pinch gesture, the control module may determine a second control input from user 100. The second control input may cause a game module (e.g., game module 30 shown in FIG. 1 and described herein) to simulate sighting through a sighting tool in a second view 401 of the virtual space. As shown in FIG. 6, simulation of sighting through a sighting tool may cause the zoom level of second view 401 of the virtual space presented to user 100 to change from a first zoom level 600 to a second zoom level 602. Second zoom level 602 may be increased relative to first zoom level 600. As shown in FIG. 7, in some implementations, second zoom level 602, may be configured to simulate a zoom level of a sighting view 700 through a sight of a firearm. In some implementations, the second control input may cause a portion of second view 401 (e.g., the portion viewed through the simulated firearm sighting view) to increase to second zoom level 602 while the rest of second view 401 remains at first zoom level 600.

In some implementations, the game module may be configured such that at least some of the virtual space and/or or game functionality normally available to a user during game play is reduced responsive to the second control input causing the game module to cause second view 401 to simulate sighting through a sighting tool. For example, while playing the first person shooter game, a user may be able to change weapons when viewing the game at first zoom level 600 but may not be able to change weapons when viewing the game through simulated sighting view 700 at second zoom level 602.

In some implementations, system 10 may be configured such that sighting view 700 is discontinued responsive to a third user interaction on touch sensitive surface 22. The third user interaction may be a pinch gesture. The third user interaction may comprise contacting touch sensitive surface 22 at two locations substantially simultaneously, then moving the two contact locations closer together while remaining in contact with touch sensitive surface 22 (e.g., substantially opposite the motion depicted in FIG. 5 and FIG. 4). The gesture recognition module may be configured to identify the third user interaction as a pinch gesture made by user 100 on touch sensitive surface 22. The gesture recognition module may be configured to determine the parameter values for the gesture parameters of the third interaction.

The determined parameter values may then be compared with the parameter values specified by the definition of the pinch gesture to determine whether the third interaction matches the gesture definition of the pinch gesture. Responsive to a match between the parameter values of the pinch gesture definition and the parameter values of the third interaction performed by the user, the gesture recognition module may be configured to identify the third interaction as the pinch gesture. A control module (e.g., control module 34 shown in FIG. 1 and described herein) may be configured such that responsive to the gesture recognition module identifying the third user interaction as a pinch gesture, the control module may determine a third control input from user 100. The third control input may cause the game module to cause sighting view 700 to be discontinued.

Figure 8:
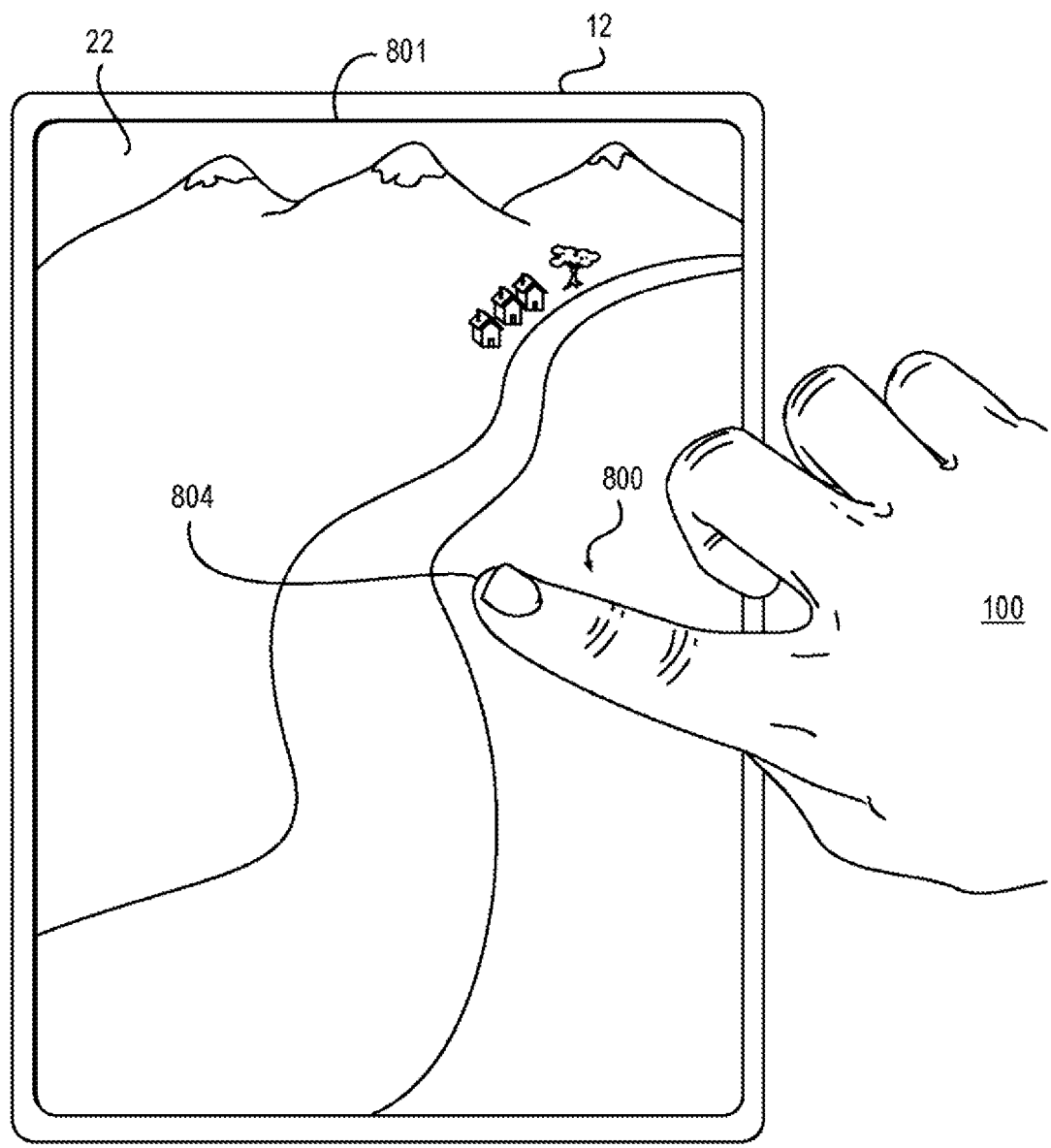
FIG. 8 illustrates a fourth interaction made by the user on the touch sensitive surface.
Figure 9:
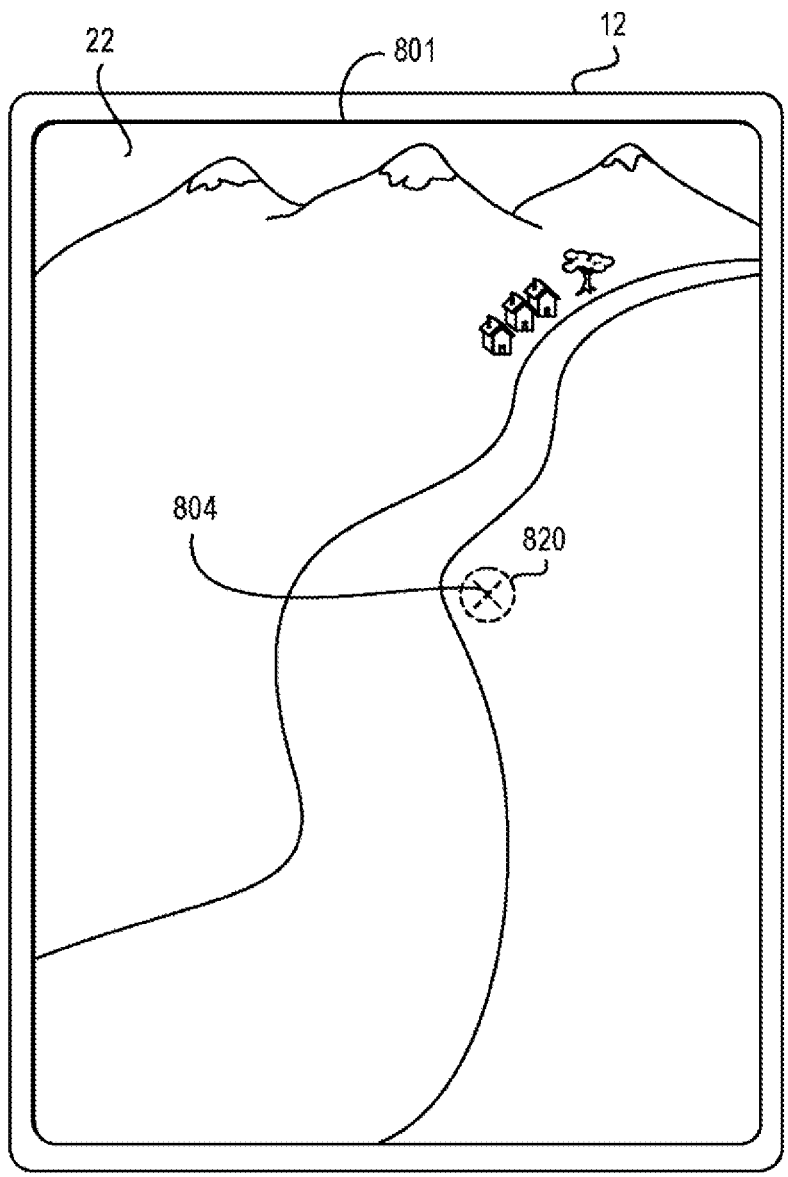
FIG. 9 illustrates a move location in the virtual space displayed on the touch sensitive surface.
Figure 10:
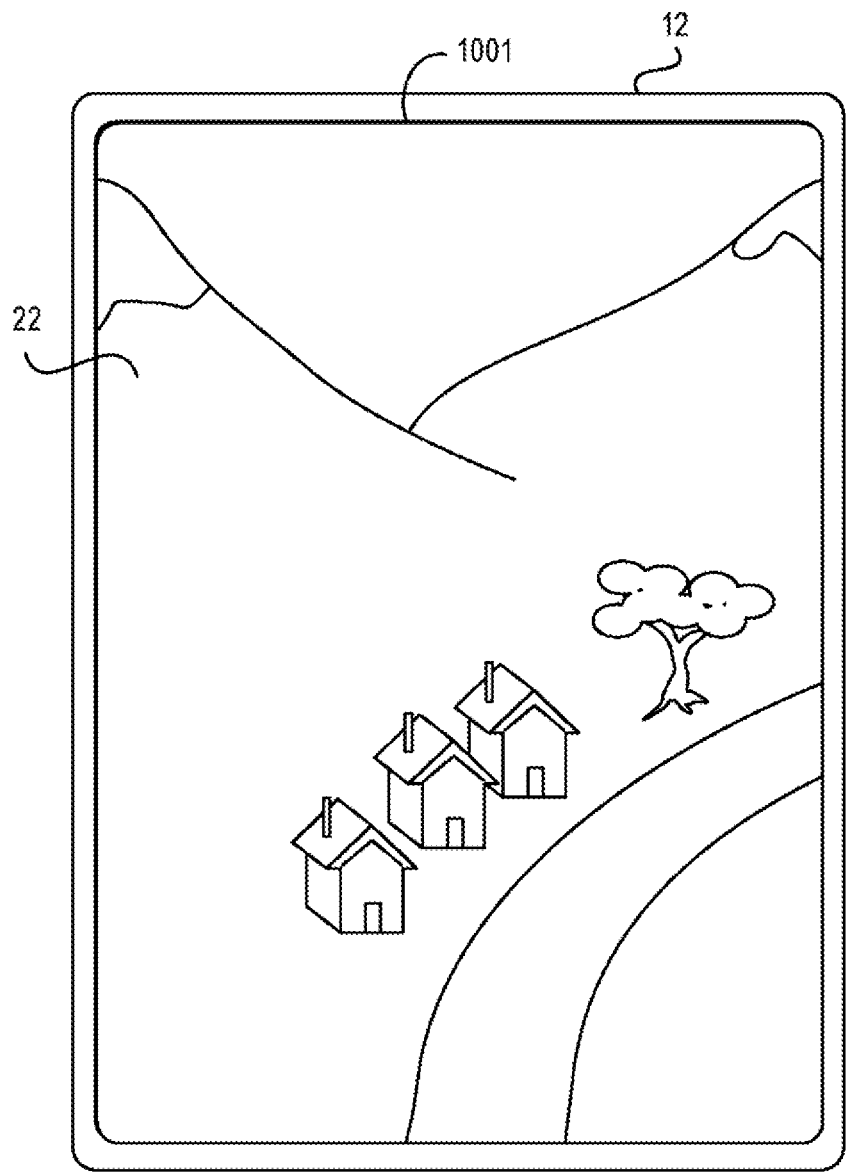
FIG. 10 illustrates a view of the virtual space from the move location.

FIG. 8-FIG. 10 illustrate a fourth user interaction 800 (FIG. 8) made by user 100 on touch sensitive surface 22 (illustrated as a touchscreen in FIG. 8-FIG. 10) and a corresponding change from a third view 801 (FIG. 8) of the virtual space to a fourth view 1001 (FIG. 10) of the virtual space. In some implementations, a game module (e.g., game module 30 shown in FIG. 1 and described herein) may be configured such that the one or more views of the virtual space for presentation to user 100 include third view 801 (FIG. 8) and fourth view 1001 (FIG. 10). As shown in FIG. 8-FIG. 10, third view 801 may correspond to a current location in the virtual space, and fourth view 1001 may correspond to a move location 804 (FIG. 8 and FIG. 9) in the virtual space.

Fourth interaction 800 may be a move gesture. Fourth interaction 800 may comprise contacting touch sensitive surface 22 at a location that corresponds to move location 804 in the virtual space. A gesture recognition module (e.g., gesture recognition module 32 shown in FIG. 1 and described herein) may be configured to identify user interaction 800 as the move gesture made by user 100 on touch sensitive surface 22. The gesture recognition module may be configured to determine the parameter values for the gesture parameters of interaction 800. The determined parameter values may then be compared with the parameter values specified by the definition of the move gesture to determine whether interaction 800 matches the gesture definition of the move gesture. Responsive to a match between the parameter values of the move gesture definition and the parameter values of interaction 800 performed by the user, the gesture recognition module may be configured to identify interaction 800 as the move gesture. The gesture definitions used to determine whether interaction 800 is a move gesture may include parameter values and/or parameter value thresholds defining one or more of a minimum and/or a maximum area 820 (FIG. 9) on touch sensitive surface 22 that defines move location 804 in the virtual space, a minimum and a maximum contact time for the contact made by the user on touch sensitive surface 22 at location 1502, and/or other gesture parameters.

A control module (e.g., control module 34 shown in FIG. 1 and described herein) may be configured such that responsive to the gesture recognition module identifying the move gesture, the control module may determine a fourth control input that causes the game module to change the view presented to user 100 from third view 801 (FIG. 8, FIG. 9) to fourth view 1001 (FIG. 10). In some implementations (e.g., wherein the touch sensitive surface is a touchscreen) move location 804 may be the location on the touchscreen at which user 100 contacts the touchscreen with move gesture 800. In some implementations, changing from third view 801 to fourth view 1001 may comprise simulated movement through the virtual space and/or through the first person shooter game. In some implementations, simulated movement through the virtual space may comprise automatically (e.g., without user 100 making any additional contact with touch sensitive surface 22 during the simulated movement) path finding around objects in the instance of the virtual space displayed to user 100.

Figure 11:
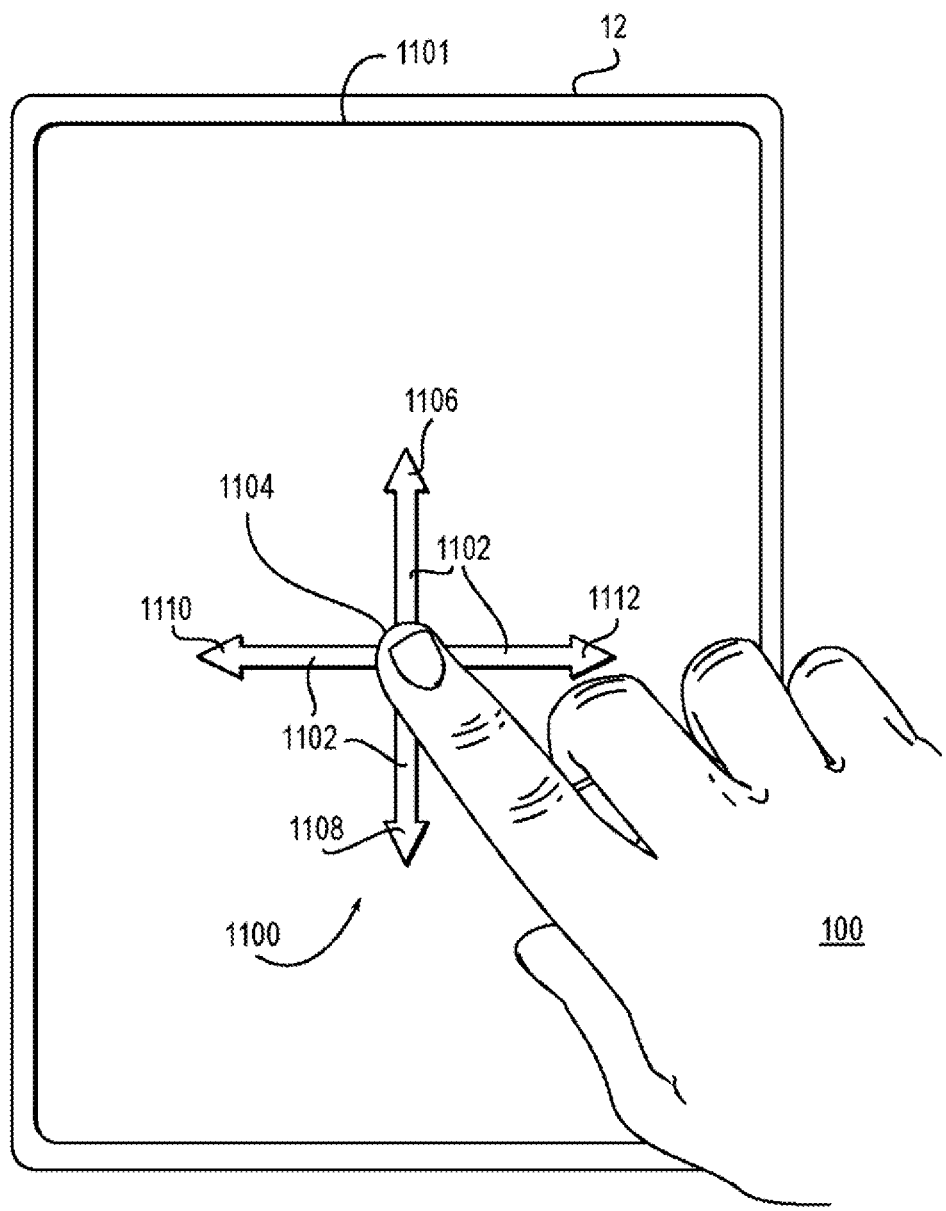
FIG. 11 illustrates a fifth user interaction made by the user on the touch sensitive surface.
Figure 12:
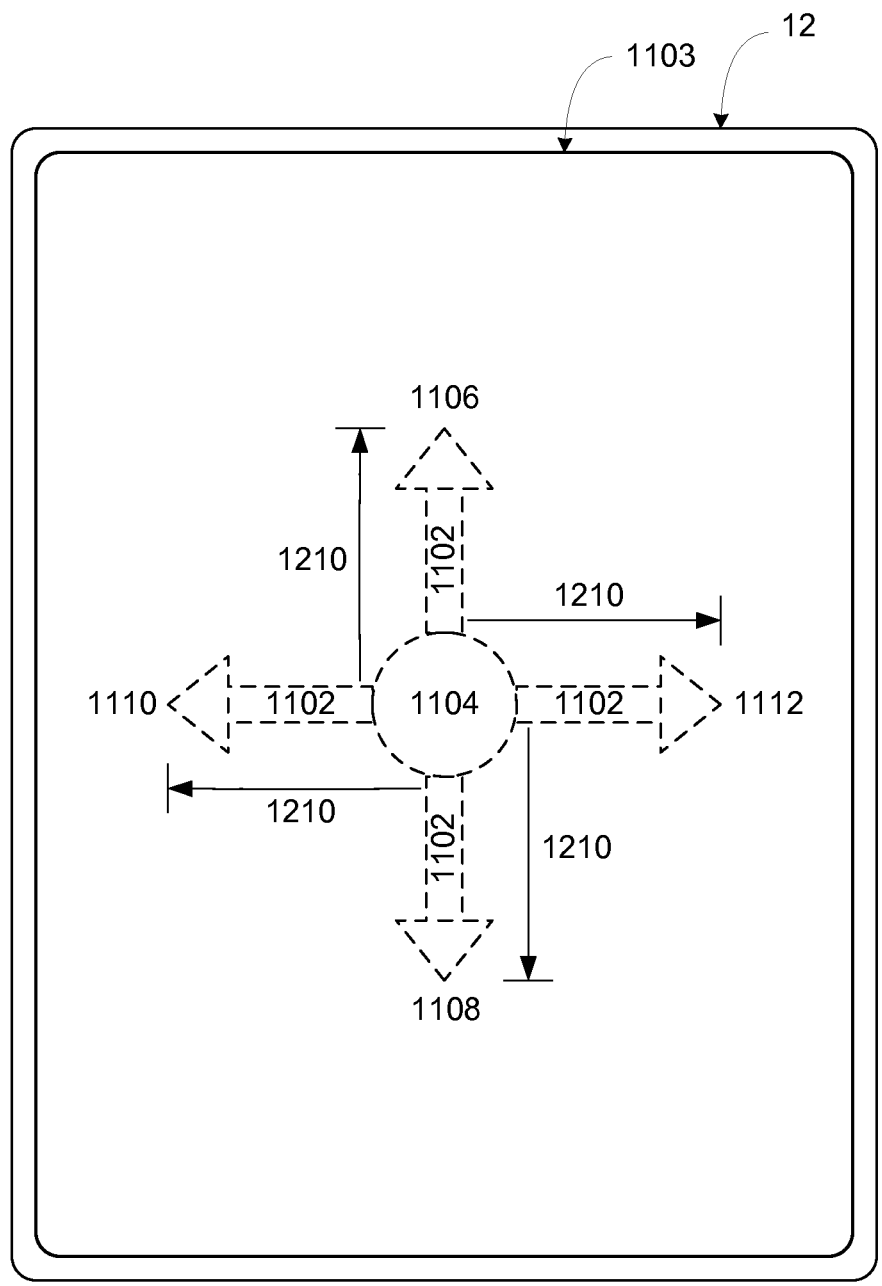
FIG. 12 illustrates a contact location of the fifth user interaction on the touch sensitive surface.

FIG. 11 and FIG. 12 illustrate a fifth user interaction 1100 (FIG. 11) made by user 100 on touch sensitive surface 22 (illustrated as a touchscreen in FIG. 11 and FIG. 12) in a fifth view 1101 of the virtual space. Fifth user interaction 1100 may be a look gesture. A user may use interaction 1100 to "look" in one or more directions in the virtual space. In some implementations, looking may comprise a game module (e.g., game module 30 shown in FIG. 1 and described herein) causing a view of the virtual space to change from fifth view 1101 to a sixth view 1103 (FIG. 12) that is representative of the virtual space in the direction indicated by user 100 via interaction 1100.

As shown in FIG. 11 and FIG. 12, interaction 1100 may comprise a directional swipe 1102 on touch sensitive surface 22. Directional swipe 1102 may comprise contacting touch sensitive surface 22 at a single location 1104, then moving contact location 1104 in one or more of a first direction 1106, a second direction 1108, a third direction 1110, a fourth direction 1112, and/or other directions, while remaining in contact with touch sensitive surface 22. A gesture recognition module (e.g., gesture recognition module 32 shown in FIG. 1 and described herein) may be configured to identify user interaction 1100 as the look gesture made by user 100 on touch sensitive surface 22. The gesture recognition module may be configured to determine the parameter values for the gesture parameters of interaction 1100. The determined parameter values may then be compared with the parameter values specified by the definition of the look gesture to determine whether interaction 1100 matches the gesture definition of the look gesture. Responsive to a match between the parameter values of the look gesture definition and the parameter values of interaction 1100 performed by the user, the gesture recognition module may be configured to identify interaction 1100 as the look gesture. The gesture definitions used to determine whether interaction 1100 is a move gesture may include parameter values and/or parameter value thresholds defining one or more of a two dimensional direction on touch sensitive surface 22, a minimum distance 1210 of the swipe made by the user on touch sensitive surface 22, and/or other gesture parameters.

A control module (e.g., control module 34) may be configured such that responsive to the gesture recognition module identifying the look gesture (FIG. 11), the control module may determine a fifth control input from user 100 that causes the game module to change fifth view 1101 to sixth view 1103 that is representative of the virtual space in the direction indicated by user 100 via interaction 1100.

In some implementations, responsive to directional swipe 1102 in first direction 1106, the control module may determine the fifth control input such that the game module changes fifth view 1101 to sixth view 1103 that is representative of looking down in the virtual space. In some implementations, responsive to directional swipe 1102 in second direction 1108, the control module may determine the fifth control input such that the game module changes fifth view 1101 to sixth view 1103 that is representative of looking up in the virtual space. In some implementations, responsive to directional swipe 1102 in third direction 1110, the control module may determine the fifth control input such that the game module changes fifth view 1101 to sixth view 1103 that is representative of looking to the left in the virtual space. In some implementations, responsive to directional swipe 1102 in fourth direction 1112, the control module may determine the fifth control input such that the game module changes fifth view 1101 to sixth view 1103 that is representative of looking to the right in the virtual space. The four directions described herein are not intended to be limiting. System 10 may be configured such that a user may use similar swiping gestures in one or more other directions to "look" in any direction in the virtual space.

Figure 13:
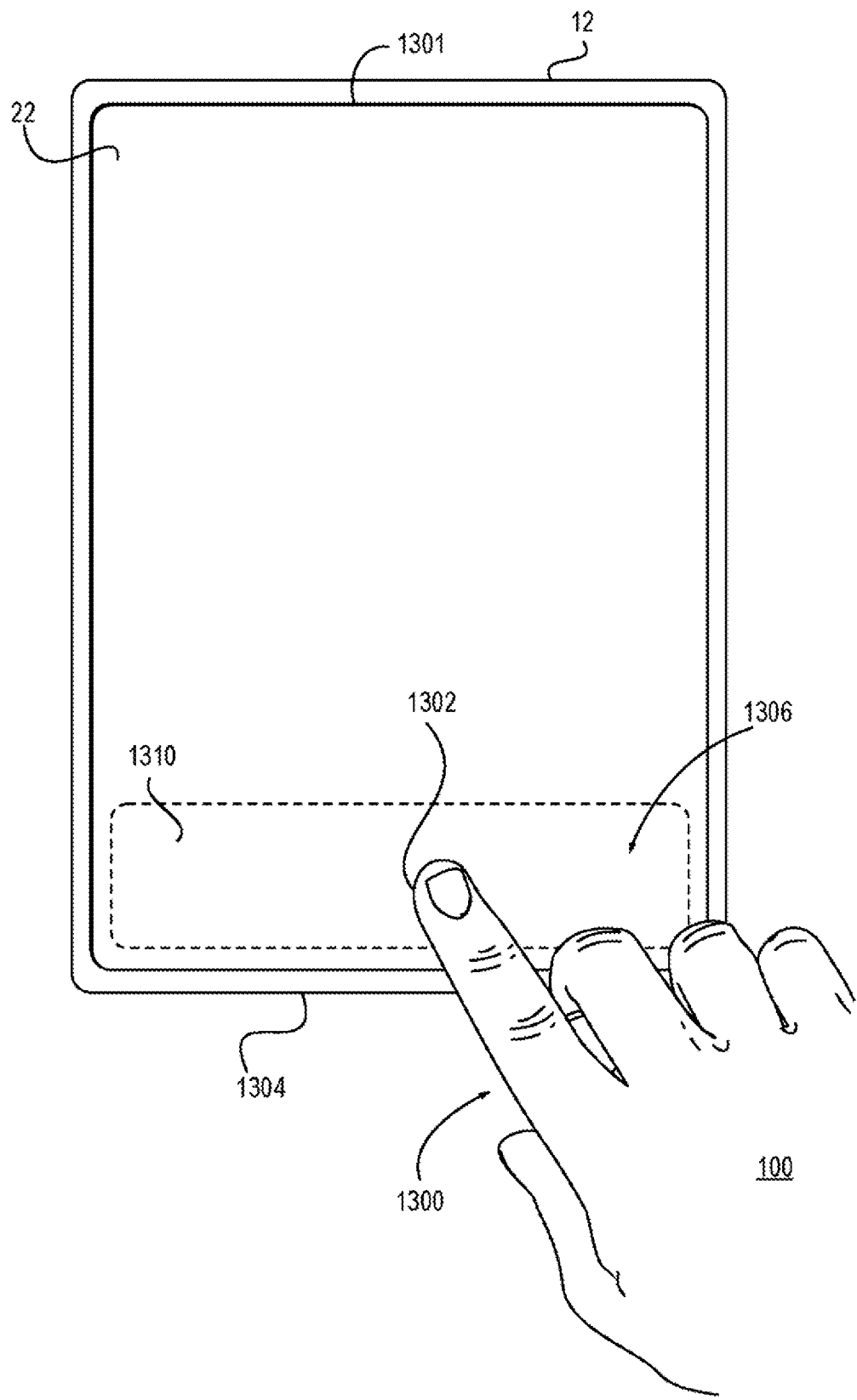
FIG. 13 illustrates a sixth user interaction made by the user on the touch sensitive surface.

FIG. 13 illustrates a sixth user interaction 1300 on touch sensitive surface 22 (illustrated as a touchscreen in FIG. 13) in a seventh view 1301 of the virtual space. Sixth user interaction 1300 may be a turn gesture. User interaction 1300 may comprise contacting touch sensitive surface 22 at a single location 1302 toward an edge 1304 of touch sensitive surface 22 in a turn gesture area 1306. In some implementations, user interaction 1300 may comprise contacting turn gesture area 1306 at and/or near the center of turn gesture area 1306. A gesture recognition module (e.g., gesture recognition module 32) may be configured to identify user interaction 1300 as the turn gesture made by user 100 on touch sensitive surface 22. The gesture recognition module may be configured to determine the parameter values for the gesture parameters of interaction 1300. The determined parameter values may then be compared with the parameter values specified by the definition of the turn gesture to determine whether interaction 1300 matches the gesture definition of the turn gesture. Responsive to a match between the parameter values of the turn gesture definition and the parameter values of interaction 1300 performed by the user, the gesture recognition module may be configured to identify interaction 1300 as the turn gesture. The gesture definitions used to determine whether interaction 1300 is a turn gesture may include parameter values and/or parameter value thresholds defining one or more of a minimum and/or a maximum area 1310 on touch sensitive surface 22 that defines turn gesture area 1306, a contact time parameter, and/or other parameters.

A control module (e.g., control module 34 shown in FIG. 1) may be configured such that responsive to the gesture recognition module identifying the turn gesture, the control module may determine a sixth control input from user 100 that causes a game module (e.g., game module 30) to change seventh view 1301 to an eighth view that is representative of the virtual space in the direction substantially behind (e.g., a 180° turn from seventh view 1301) user 100. In some implementations, system 10 may be configured such that turn gesture area 1306 may be visible to a user via lines enclosing turn gesture area 1306, for example, and/or other visible markings that show turn gesture area 1306 relative to other areas of seventh view 1301 displayed to user 100. In some implementations, system 10 may be configured such that turn gesture area 1306 is invisible to user 100.

Figure 14:
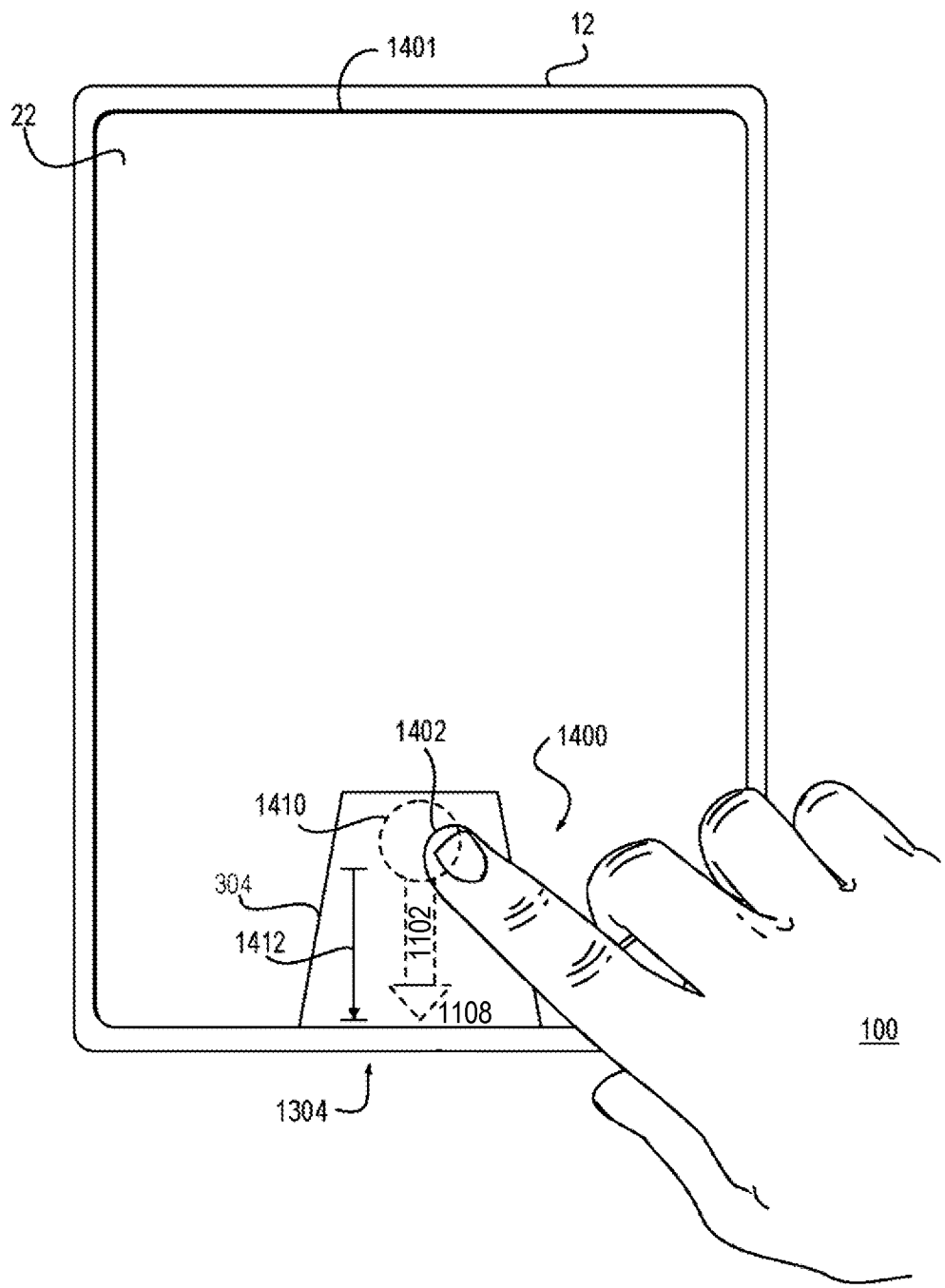
FIG. 14 illustrates a seventh user interaction made by the user on the touch sensitive surface.

FIG. 14 illustrates a seventh user interaction 1400 on touch sensitive surface 22 (illustrated as a touchscreen in FIG. 14) in a ninth view 1401 of the virtual space. Seventh user interaction 1400 may be a weapon change gesture. A game module (e.g., game module 30) may be configured to display weapon 304 to user 100 in ninth view 1401. Seventh user interaction 1400 may comprise contacting touch sensitive surface 22 at a single location 1402 that corresponds to a location where weapon 304 is displayed in the virtual space. In some implementations, user interaction 1400 may further comprise contacting touch sensitive surface 22 at the location that corresponds to weapon 304 and directionally swiping 1102 location 1402 on touch sensitive surface 22 in second direction 1108 toward edge 1304 of touch sensitive surface 22. A gesture recognition module (e.g., gesture recognition module 32) may be configured to identify user interaction 1400 as the weapon change gesture made by user 100 on touch sensitive surface 22. The gesture recognition module may be configured to determine the parameter values for the gesture parameters of interaction 1400. The determined parameter values may then be compared with the parameter values specified by the definition of the weapon change gesture to determine whether interaction 1400 matches the gesture definition of the weapon change gesture. Responsive to a match between the parameter values of the weapon change gesture definition and the parameter values of interaction 1400 performed by user 100, the gesture recognition module may be configured to identify interaction 1400 as the weapon change gesture. The gesture definitions used to determine whether interaction 1400 is a weapon change gesture may include parameter values and/or parameter value thresholds defining one or more of a minimum and/or a maximum area 1410 on touch sensitive surface 22 that defines location 1402 where weapon 304 is displayed, a direction on touch sensitive surface 22, a minimum distance 1412 of the swipe made by the user on touch sensitive surface 22, and/or other gesture parameters.

A control module (e.g., control module 34) may be configured such that responsive to the gesture recognition module identifying the weapon change gesture, the control module may determine a seventh control input from user 100 that causes the game module (e.g., game module 30) to change weapon 304 to another weapon. The swipe direction and edge description related to interaction 1400 described herein is not intended to be limiting. Interaction 1400 may include swiping on weapon 304 in any direction toward any edge of touch sensitive surface 22.

Figure 15:
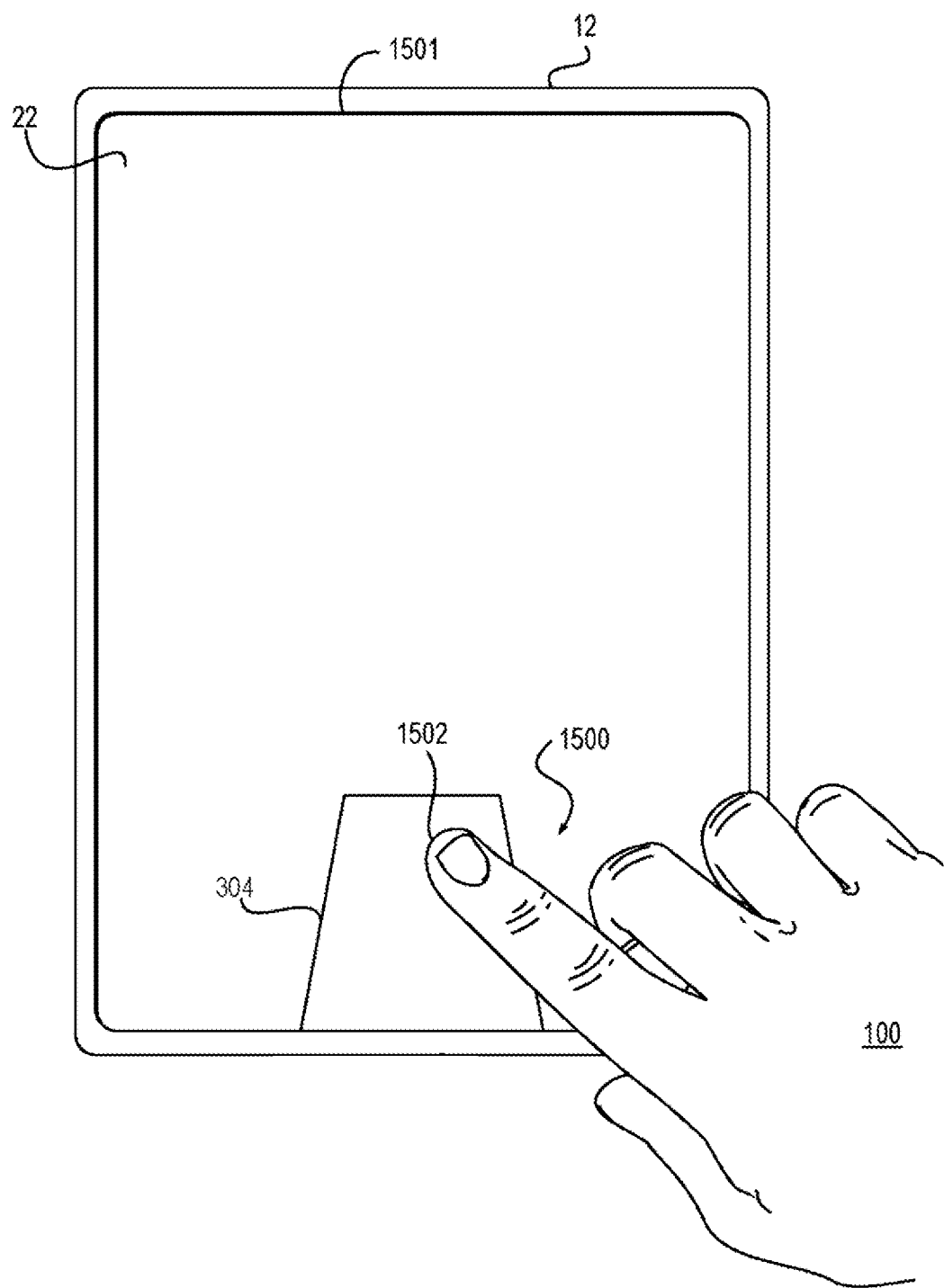
FIG. 15 illustrates an eighth user interaction made by the user on the touch sensitive surface.
Figure 16:
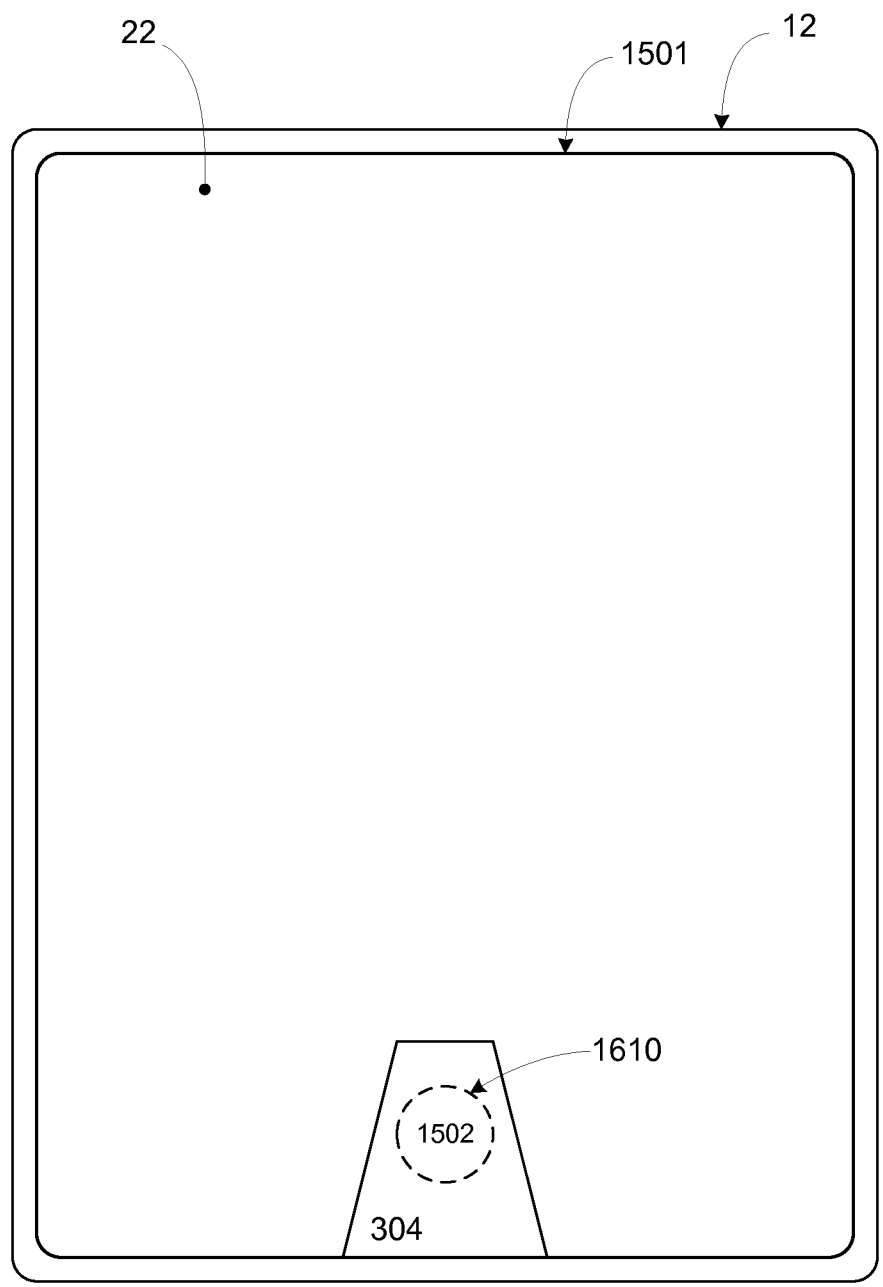
FIG. 16 illustrates a contact point of the eighth user interaction on the touch sensitive surface.

FIG. 15 and FIG. 16 illustrate an eighth user interaction 1500 made by user 100 on touch sensitive surface 22 (illustrated as a touchscreen in FIG. 15 and FIG. 16) in a tenth view 1501 of the virtual space. Eighth user interaction 1500 may be a reload gesture. A game module (e.g., game module 30) may be configured to display weapon 304 to user 100 in view 1501. User interaction 1500 may comprise a single tap on touch sensitive surface 22 at a location 1502 on touch sensitive surface 22 that corresponds to a location where weapon 304 is displayed in the virtual space. A gesture recognition module (e.g., gesture recognition module 32) may be configured to identify user interaction 1500 as the reload gesture made by user 100 on touch sensitive surface 22. The gesture recognition module may be configured to determine the parameter values for the gesture parameters of interaction 1500. The determined parameter values may then be compared with the parameter values specified by the definition of the reload gesture to determine whether interaction 1500 matches the gesture definition of the reload gesture. Responsive to a match between the parameter values of the reload gesture definition and the parameter values of interaction 1500 performed by the user, the gesture recognition module may be configured to identify interaction 1500 as the reload gesture. The gesture definitions used to determine whether interaction 1500 is a reload gesture may include parameter values and/or parameter value thresholds defining one or more of a minimum and/or a maximum area 1610 (FIG. 16) on touch sensitive surface 22 that defines location 1502 where weapon 304 is displayed, a minimum and a maximum contact time for the contact made by the user on touch sensitive surface 22 at location 1502, and/or other gesture parameters.

A control module (e.g., control module 34) may be configured such that responsive to the gesture recognition module identifying the reload gesture, the control module may determine an eighth control input from the user that causes the game module to reload weapon 304.

Returning to FIG. 1, in some implementations, user interface 16 may be configured to provide an interface between system 10 and the user through which the user may provide information to system 10, and receive information from system 10. This enables additional data, cues, results, and/or instructions and any other communicable items, collectively referred to as "information," to be communicated between the user and system 10. Examples of additional interface devices suitable for inclusion in user interface 16 comprise touch sensitive surface 22, display 24, a keypad, buttons, switches, a keyboard, knobs, levers, speakers, a microphone, an indicator light, an audible alarm, a printer, and/or other interface devices. In one implementation, user interface 16 comprises a plurality of separate interfaces. In one implementation, user interface 16 comprises at least one interface that is provided integrally with wireless client 12.

It is to be understood that other communication techniques, either hard-wired or wireless, are also contemplated by the present disclosure as user interface 16. For example, the present disclosure contemplates that at least a portion of user interface 16 may be integrated with a removable storage interface provided in wireless client 12. In this example, information may be loaded into wireless client 12 from removable storage (e.g., a smart card, a flash drive, a removable disk, etc.) that enables the user to customize the implementation of wireless client 12. Other exemplary input devices and techniques adapted for use with wireless client 12 as at least a portion of user interface 16 comprise, but are not limited to, an RS-232 port, RF link, an IR link, modem (telephone, cable or other). In short, any additional technique for communicating information with client computing platform 16 is contemplated by the present disclosure as user interface 16.

Electronic storage 20 may comprise electronic storage media that electronically stores information. The electronic storage media of electronic storage 20 may include one or both of system storage that is provided integrally (i.e., substantially non-removable) within wireless client 12 and/or removable storage that is removably connectable to wireless client 12 via, for example, a port (e.g., a USB port, a firewire port, etc.) or a drive (e.g., a disk drive, etc.). Electronic storage 20 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 20 may include one or more virtual storage resources (e.g., cloud storage, a virtual private network, and/or other virtual storage resources). Electronic storage 20 may store software algorithms, information determined by processor 18, information received from game server 14, and/or other information that enables wireless client 12 to function as described herein. By way of a non-limiting example, the definitions of the set of gestures recognized by gesture recognition module 32 may be stored in electronic storage 20.

Game server 14 may be configured to host the virtual space, the first person shooter game, and/or other applications, in a networked manner. Game server 14 may include one or more processors 40, electronic storage 42, and/or other components. Processor 40 may be configured to execute a game server module 44. Game server module 44 may be configured to communicate virtual space and/or game information with a game module (e.g., game module 30) being executed on wireless client device 12 and/or one or more other wireless client devices in order to provide an online multi-player experience to the users of the wireless client devices. This may include executing an instance of the virtual space and providing virtual space information, including view information, virtual space state information, and/or other virtual space information, to wireless client device 12 and/or the one or more other wireless client devices to facilitate participation of the users of the wireless client devices in a shared virtual space experience. Game server module 44 may be configured to facilitate communication between the users, as well as gameplay.

Processors 40 may be implemented in one or more of the manners described with respect to processor 18 (shown in FIG. 1 and described above). This includes implementations in which processor 40 includes a plurality of separate processing units, and/or implementations in which processor 40 is virtualized in the cloud. Electronic storage 42 may be implemented in one or more of the manners described with respect to electronic storage 20 (shown in FIG. 1 and described above).

Figure 17:
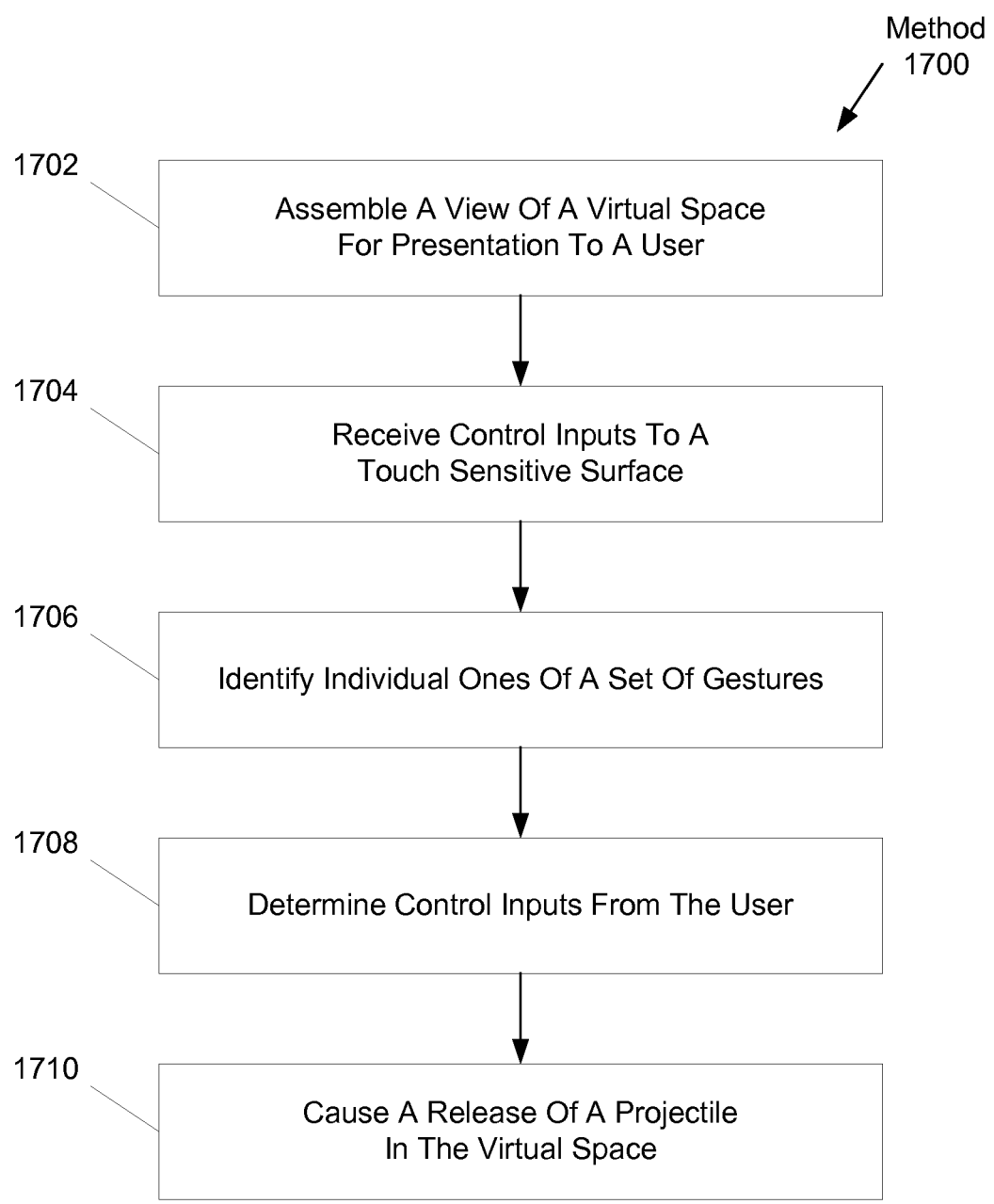
FIG. 17 illustrates a method for facilitating interaction with a virtual space.

FIG. 17 illustrates a method 1700 for facilitating interaction with a virtual space. The operations of method 1700 presented below are intended to be illustrative. In some implementations, method 1700 may be accomplished with one or more additional operations not described, and/or without one or more of the operations discussed. Additionally, the order in which the operations of method 1700 are illustrated in FIG. 17 and described herein is not intended to be limiting.

In some implementations, method 1700 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 1700 in response to instructions stored electronically on an electronic storage medium. The one or more processing devices may include one or more devices configured through hardware, firmware, and/or software to be specifically designed for execution of one or more of the operations of method 1700. In some implementations, at least some of the operations described below may be implemented by a server wherein the system described herein communicates with the server in a client/server relationship over a network.

At an operation 1702, a view of a virtual space may be assembled for presentation to a user. In some implementations, operation 1702 may be performed by a game module similar to, and/or the same as game module 30 (shown in FIG. 1, and described herein).

At an operation 1704, control inputs to a touch sensitive surface may be received. The touch sensitive surface may be configured to generate output signals responsive to contact by the user. The output signals may be configured to convey information related to one or more locations where the touch sensitive surface is contacted. The control inputs may be reflected in the view of the virtual space. In some implementations, operation 1704 may be performed by a touch sensitive surface similar to and/or the same as touch sensitive surface 22 (shown in FIG. 1, and described herein).

At an operation 1706, individual ones of a set of gestures may be identified. The individual ones of the set of gestures may be made by the user on the touch sensitive surface. The individual ones of the set of gestures may be identified based on the output signals from the touch sensitive surface. The individual ones of the set of gestures may include a two fingered tap gesture. The two fingered tap gesture may comprise tapping the touch sensitive surface at two locations substantially simultaneously. In some implementations, operation 1706 may be performed by a gesture recognition module similar to, and/or the same as gesture recognition module 32 (shown in FIG. 1 and described herein).

At an operation 1708, control inputs from the user may be determined. Determining the control inputs from the user may be based on the identified gestures. Responsive to identifying the two fingered tap gesture, a first control input from the user may be determined. In some implementations, operation 1708 may be performed by a control module similar to, and/or the same as control module 34 (shown in FIG. 1 and described herein).

At an operation 1710, a projectile may be caused to be released in the virtual space. The first control input may cause the release of the projectile in the virtual space. Responsive to identifying the two fingered tap gesture, a target location in the virtual space may be specified toward which the projectile is directed. The target location may correspond to a control location on the touch sensitive surface that corresponds to one or both of the locations at which the user contacted the touch sensitive surface in making the two fingered tap gesture. In some implementations, operation 1710 may be performed by a game module similar to, and/or the same as game module 30 (shown in FIG. 1 and described herein).

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A system for facilitating interaction with a virtual space, the system comprising:
    a touch sensitive surface configured to generate output signals responsive to contact by a user, the output signals configured to convey information related to one or more locations where the touch sensitive surface is contacted; and
    one or more processors configured to execute computer program modules, the computer program modules comprising:
    a game module configured to facilitate interaction of the user with a virtual space by assembling a view of the virtual space for presentation to the user, wherein the user interacts with the virtual space by providing control inputs that are reflected in the view of the virtual space wherein the tame module is configured such that the view of the virtual space for presentation to the user includes a first view and a second view, the first view corresponding to a current location in the virtual space, and the second view corresponding to a move location in the virtual space;
    a gesture recognition module configured to identify individual ones of a set of gestures made by the user on the touch sensitive surface based on the output signals from the touch sensitive surface, and wherein the individual ones of the set of gestures include a two fingered tap gesture, the two fingered tap gesture comprising tapping the touch sensitive surface at two locations substantially simultaneously, wherein the gesture recognition module is configured such that the individual ones of the set of gestures include a move gesture, the move gesture comprising contacting the touch sensitive surface at a location that corresponds to the move location in the virtual space;
    a control module configured to determine control inputs from the user based on the identified gestures,
    wherein the control module is configured such that responsive to the gesture recognition module identifying the two fingered tap gesture, the control module determines a first control input from the user that causes a release of a projectile in the virtual space; and
    wherein the control module is configured such that responsive to the gesture recognition module identifying the two fingered tap gesture, the first control input specifies a target location in the virtual space toward which the projectile is directed, the target location corresponding to a control location on the touch sensitive surface that corresponds to one or both of the locations at which the user contacted the touch sensitive surface in making the two fingered tap gesture; and
    wherein the control module is configured such that responsive to the gesture recognition module identifying the move gesture, the control module determines a third control input that causes the game module to change the view presented to the user from the first view to the second view.

2. The system of claim 1, wherein the target location corresponding to the control location on the touch sensitive surface that corresponds to both of the locations at which the user contacted the touch sensitive surface in making the two fingered tap gesture.

3. The system of claim 2, wherein the touch sensitive surface is a touchscreen configured to present the view of the virtual space, and wherein the control location is the location on the touchscreen at which the target location is displayed.

4. They system of claim 2, wherein the control location is the center point between the two locations at which the user contacted the touch sensitive surface in making the two fingered tap gesture.

5. The system of claim 1, wherein the gesture recognition module is configured such that the individual ones of the set of gestures include a reverse pinch gesture, the reverse pinch gesture comprising contacting the touch sensitive surface at two locations substantially simultaneously, then moving the two contact locations farther apart while remaining in contact with the touch sensitive surface, and
    wherein the control module is configured such that responsive to the gesture recognition module identifying the reverse pinch gesture, the control module determines a second control input from the user that causes a zoom level of the view of the virtual space presented to the user to change from a first zoom level to a second zoom level, the second zoom level increased relative to the first zoom level.

6. The system of claim 5, wherein the second zoom level is configured to simulate a zoom level of a sighting view through a sighting tool of a firearm.

7. The system of claim 1, wherein the touch sensitive surface is a touchscreen configured to present the first view and the second view of the virtual space, and wherein the move location is the location on the touchscreen at which the user contacts the touchscreen with the move gesture.

8. The system of claim 1, wherein changing from the first view to the second view comprises simulated movement through the virtual space.

9. The system of claim 1, wherein the game module facilitates interaction with the virtual space by causing the virtual space to express an instance of a first person shooter game for presentation to the user, wherein the user interacts with the first person shooter game by providing the control inputs via the touch sensitive surface.

10. A method implemented on a computing device having one or more processors, memory, and a touch sensitive surface for facilitating interaction with a virtual space, the method comprising:
assembling a view of the virtual space for presentation to a user;
receiving control inputs to the touch sensitive surface from the user, the touch sensitive surface configured to generate output signals responsive to contact by the user, the output signals configured to convey information related to one or more locations where the touch sensitive surface is contacted, the control inputs reflected in the view of the virtual space, wherein the view of the virtual space for presentation to the user includes a first view and a second view, the first view corresponding to a current location in the virtual space, and the second view corresponding to a move location in the virtual space;
identifying individual ones of a set of gestures made by the user on the touch sensitive surface based on the output signals from the touch sensitive surface, wherein the individual ones of the set of gestures include a two fingered tap gesture, the two fingered tap gesture comprising tapping the touch sensitive surface at two locations substantially simultaneously, wherein the individual ones of the set of gestures include a move gesture, the move gesture comprising contacting the touch sensitive surface at a location that corresponds to the move location in the virtual space; and
determining the control inputs from the user based on the identified gestures,
wherein, responsive to identifying the two fingered tap gesture, a first control input from the user is determined, the first control input causing a release of a projectile in the virtual space, and
wherein, responsive to identifying the move gesture, a third control input from the user is determined, the third control input causing a change in the view presented to the user from the first view to the second view.

11. The method of claim 10, further comprising, responsive to identifying the two fingered tap gesture, specifying a target location in the virtual space toward which the projectile is directed, the target location corresponding to a control location on the touch sensitive surface that corresponds to one or both of the locations at which the user contacted the touch sensitive surface in making the two fingered tap gesture.

12. The method of claim 11, wherein the touch sensitive surface is a touchscreen configured to present the view of the virtual space, and wherein the control location is the location on the touchscreen at which the target location is displayed.

13. The method of claim 11, wherein the control location is the center point between the two locations at which the user contacted the touch sensitive surface in making the two fingered tap gesture.

14. A system for facilitating interaction with a virtual space, the system comprising:
a touch sensitive surface configured to generate output signals responsive to contact by a user, the output signals configured to convey information related to one or more locations where the touch sensitive surface is contacted; and
one or more processors configured to execute computer program modules, the computer program modules comprising:
a game module configured to facilitate interaction of the user with a virtual space by assembling a view of the virtual space for presentation to the user, wherein the user interacts with the virtual space by providing control inputs that are reflected in the view of the virtual space, wherein the game module is configured such that the view of the virtual space for presentation to the user includes a first view and a second view, the first view corresponding to a current location in the virtual space, and the second view corresponding to a move location in the virtual space;
a gesture recognition module configured to identify individual ones of a set of gestures made by the user on the touch sensitive surface based on the output signals from the touch sensitive surface, and wherein the individual ones of the set of gestures include a two fingered tap gesture, the two fingered tap gesture comprising tapping the touch sensitive surface at two locations substantially simultaneously; and
a control module configured to determine control inputs from the user based on the identified gestures,
wherein the control module is configured such that responsive to the gesture recognition module identifying the two fingered tap gesture, the control module determines a first control input from the user that causes a release of a projectile in the virtual space,
wherein the gesture recognition module is further configured such that the individual ones of the set of gestures include a move gesture, the move gesture comprising contacting the touch sensitive surface at a location that corresponds to the move location in the virtual space, and
wherein the control module is configured such that responsive to the gesture recognition module identifying the move gesture, the control module determines a second control input that causes the game module to change the view presented to the user from the first view to the second view.

* * * * *